(12) United States Patent
Endo et al.

(10) Patent No.: US 11,366,040 B2
(45) Date of Patent: Jun. 21, 2022

(54) DIAGNOSIS APPARATUS FOR ESTIMATING SCRATCH IN BEARING MECHANISM, METHOD THEREOF, AND COMPUTER-READABLE RECORDING MEDIUM

(71) Applicant: OMRON Corporation, Kyoto (JP)

(72) Inventors: Maki Endo, Kyoto (JP); Teruyuki Shiraki, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 120 days.

(21) Appl. No.: 16/987,423

(22) Filed: Aug. 7, 2020

(65) Prior Publication Data
US 2021/0072117 A1    Mar. 11, 2021

(30) Foreign Application Priority Data

Sep. 10, 2019  (JP) .............................. JP2019-164180
Jan. 30, 2020  (JP) .............................. JP2020-013942

(51) Int. Cl.
  *G01M 13/045* (2019.01)
(52) U.S. Cl.
  CPC ....... *G01M 13/045* (2013.01); *F16C 2233/00* (2013.01)
(58) Field of Classification Search
  CPC .... G01M 13/00; G01M 13/04; G01M 13/045; F16C 2233/00; F16C 19/00; F16C 19/52; F16C 19/527
  See application file for complete search history.

(56) References Cited

U.S. PATENT DOCUMENTS

2014/0142872 A1 *  5/2014  Hedin .................. G05B 23/024
                                                                702/56
2019/0250066 A1 *  8/2019  Guo .................... G01M 13/045

FOREIGN PATENT DOCUMENTS

JP      2016179527     10/2016

OTHER PUBLICATIONS

Luo, Maolin, "An analytic model for estimating spalled zone size of rolling element bearing based on dual-impulse time separation," Apr. 2019, Journal of Sound and Vibration 453, pp. 87-102 (Year: 2019).*
Igarashi, Teruo, "Studies on the Vibration and Sound of Defective Rolling Bearings," Mar. 1985, Bulletin of JSME, vol. 28, No. 237, pp. 493-495 (Year: 1985).*

* cited by examiner

*Primary Examiner* — Son T Le
*Assistant Examiner* — Matthew W. Baca
(74) *Attorney, Agent, or Firm* — JCIPRNET

(57) ABSTRACT

Degradation degree of a bearing mechanism is diagnosed. A diagnosis apparatus includes: an acquisition unit that acquires measurement data relating to vibrations corresponding to a rotation of a bearing mechanism including rolling elements between an outer ring and an inner ring; an extraction unit that extracts a feature amount from a result of performing a frequency analysis on the measurement data; an estimation unit that estimates a size of a scratch generated on the outer ring or the inner ring based on a predetermined relationship between a change of the feature amount and a size of a scratch generated on the outer ring or the inner ring, and based on the feature amount extracted by the extraction unit; and an output unit that outputs an estimation result of the estimation unit.

14 Claims, 18 Drawing Sheets when rotation speed is great when rotation speed is small

| operation time | outer ring scratch feature amount | inner ring scratch feature amount |
|---|---|---|
| T1 | $F_{OUT\_}1$ | $F_{IN\_}1$ |
| T2 | $F_{OUT\_}2$ | $F_{IN\_}2$ |
| ... | | |

| operation time | position of scratch | size of scratch |
|---|---|---|
| ... | | |
| T1700 | inner ring (one) | — |
| T2000 | inner ring (one) | 4 mm |
| T2100 | inner ring (one) | 8 mm |
| T2300 | inner ring (one) | 12 mm |
| T2600 | inner ring (one) | 16 mm |
| T3200 | inner ring (two) | 32 mm, 8 mm |
| ... | | |

FIG. 17

DIAGNOSIS APPARATUS FOR ESTIMATING SCRATCH IN BEARING MECHANISM, METHOD THEREOF, AND COMPUTER-READABLE RECORDING MEDIUM

CROSS REFERENCE TO RELATED APPLICATIONS

This application claims the priority benefit of Japanese Patent Application No. 2019-164180, filed on Sep. 10, 2019 and 2020-013942, filed on Jan. 30, 2020. The entirety of the above-mentioned patent application is hereby incorporated by reference herein and made a part of this specification.

BACKGROUND

Technical Field

The disclosure relates to a diagnosis apparatus, a diagnosis method, and a diagnosis program.

Related Art

Conventionally, for preventive maintenance of a production machine in which a decelerator including a bearing mechanism and the like is used, a periodic inspection is performed to diagnose a deteriorated state of the decelerator and the like and determine whether or not to replace the decelerator and the like. When deterioration such as a scratch in the bearing mechanism is generated, iron powder mixes with lubricating oil or grease in the bearing mechanism. Therefore, in the above periodic inspection, it is customary for a worker to stop the production machine, open an outer lid, and take out the lubricating oil or the grease in the bearing mechanism to measure iron powder concentration.

As a technique related to this diagnosis, for example, a robot control apparatus is proposed that can perform abnormality diagnosis of a robot without preparation in advance and without interrupting a production process. This robot control apparatus acquires first data used for the abnormality diagnosis in time series and acquires second data used for extracting the first data used for the abnormality diagnosis in time series. Then, this robot control apparatus extracts the first data which corresponds to an extraction time of the first data specified based on the second time series data and used for the abnormality diagnosis, and performs the abnormality diagnosis of the robot based on the extracted first data (see patent literature 1 (Japanese Patent Application Laid-Open No. 2016-179527)).

The apparatus recited in patent literature 1 diagnoses an abnormality of a motor or a decelerator from data which is easy to collect, such as a motor current and the like, without stopping the target production machine (the robot). However, in the apparatus recited in patent literature 1, only the presence or absence of abnormality can be diagnosed, but a deterioration degree of the bearing mechanism cannot be grasped. Therefore, the user cannot determine when and what countermeasure should be taken.

The disclosure provides a diagnosis apparatus, method, and program capable of diagnosing a deterioration degree of a bearing mechanism.

SUMMARY

The diagnosis apparatus according to the disclosure includes: an acquisition unit that acquires data relating to vibrations corresponding to a rotation of a bearing mechanism including rolling elements between an outer ring and an inner ring; an extraction unit that extracts a feature amount from a result of performing a frequency analysis on the data acquired by the acquisition unit; an estimation unit that estimates a size of a scratch generated on the outer ring or the inner ring based on a predetermined relationship between a change of the feature amount and the size of the scratch generated on the outer ring or the inner ring, and based on the feature amount extracted by the extraction unit; and an output unit that outputs an estimation result of the estimation unit.

In addition, the diagnosis method according to the disclosure is a method in which an acquisition unit acquires data relating to vibrations corresponding to a rotation of a bearing mechanism including rolling elements between an outer ring and an inner ring; an extraction unit extracts a feature amount from a result of performing a frequency analysis on the data acquired by the acquisition unit; an estimation unit estimates a size of a scratch generated on the outer ring or the inner ring based on a predetermined relationship between a change of the feature amount and a size of a scratch generated on the outer ring or the inner ring, and based on the feature amount extracted by the extraction unit; and an output unit outputs an estimation result of the estimation unit.

In addition, the computer-readable recording medium that stores a diagnosis program according to the disclosure is for making a computer function as: an acquisition unit that acquires data relating to vibrations corresponding to a rotation of a bearing mechanism including rolling elements between an outer ring and an inner ring; an extraction unit that extracts a feature amount from a result of performing a frequency analysis on the data acquired by the acquisition unit; an estimation unit that estimates a size of a scratch generated on the outer ring or the inner ring based on a predetermined relationship between a change of the feature amount and a size of a scratch generated on the outer ring or the inner ring, and based on the feature amount extracted by the extraction unit; and an output unit that outputs an estimation result of the estimation unit.

According to the diagnosis apparatus, method, and program of the disclosure, the degradation degree of the bearing mechanism can be diagnosed.

BRIEF DESCRIPTION OF THE DRAWINGS

FIG. 14 is a diagram showing an example of a feature amount DB.

FIG. 17 is a diagram showing an example of a diagnosis result DB.

DESCRIPTION OF THE EMBODIMENTS

Figure 1:
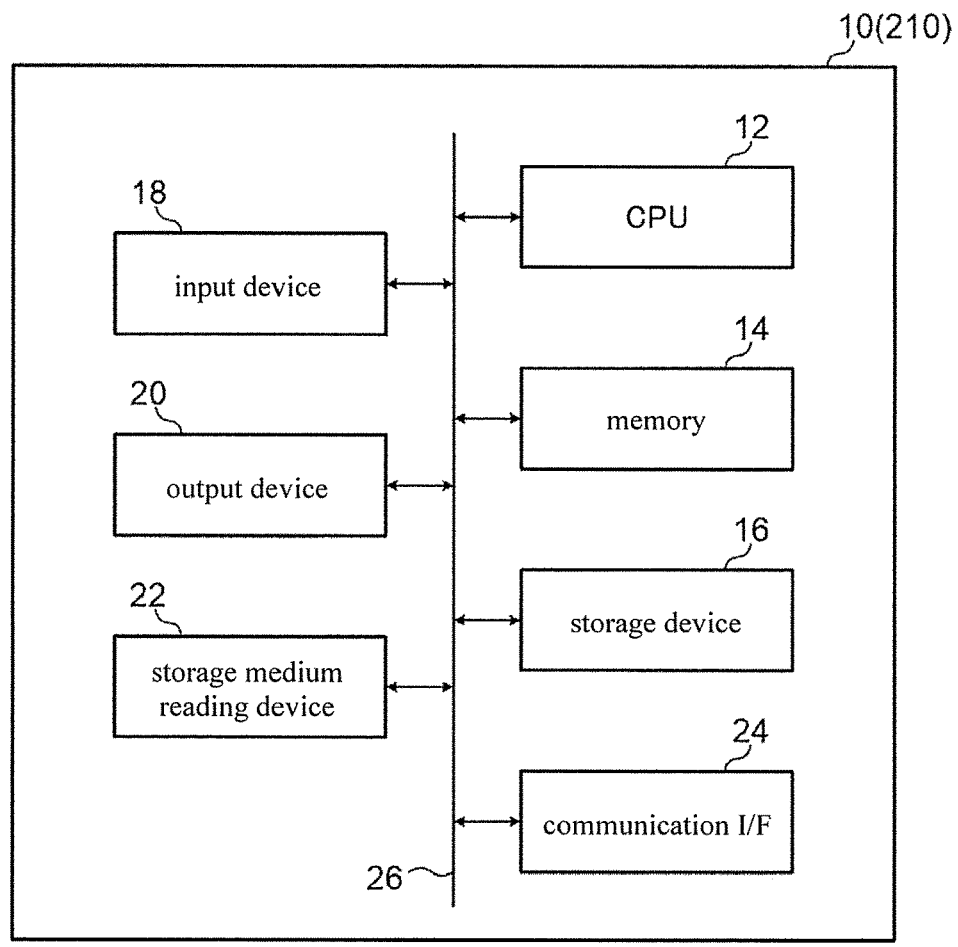
FIG. 1 is a block diagram showing hardware configurations of a diagnosis apparatus.

An example of an embodiment of the disclosure is described below with reference to the drawings. Moreover, in each drawing, the same or equivalent constituent elements and parts are designated by the same reference numerals. In addition, dimensions and ratios in the drawings are exaggerated for convenience of description and may differ from actual ratios.

First Embodiment

FIG. 1 is a block diagram showing hardware configurations of a diagnosis apparatus 10 according to a first embodiment. As shown in FIG. 1, the diagnosis apparatus 10 has a central processing unit (CPU) 12, a memory 14, a storage device 16, an input device 18, an output device 20, a storage medium reading device 22, and a communication interface (I/F) 24. The respective configurations are connected via a bus 26 to communicate with each other.

In the storage device 16, diagnosis programs for performing diagnosis processing are stored. The CPU 12 is a central processing unit and executes various programs or controls each configuration. That is, the CPU 12 reads out the programs from the storage device 16 and executes the program using the memory 14 as a work region. The CPU 12 controls the above configurations and performs a variety of arithmetic processing according to the programs stored in the storage device 16.

The memory 14 is configured by a random access memory (RAM) and serves as a work region to temporarily store the programs and data. The storage device 16 is configured by a read only memory (ROM) and a hard disk drive (HDD) or solid state drive (SSD) and stores various programs including an operating system and various data.

The input device 18 is, for example, a device such as a keyboard, a mouse, or the like for performing various inputs. The output device 20 is, for example, a device such as a display, a printer or the like for outputting a variety of information. A touch panel display may be employed as the output device 20 to thereby function as the input device 18.

The storage medium reading device 22 performs read-in of data stored in various storage mediums such a compact disc (CD)-ROM, digital versatile disc (DVD)-ROM, Blu-ray disc, universal serial bus (USB) memory and the like, writing-in of data with respect to the storage mediums, and the like.

The communication OF 24 is an interface for communicating with other equipment, and for example, a standard such as Ethernet (registered trademark), FDDI, Wi-Fi (registered trademark), or the like is used.

Figure 2:
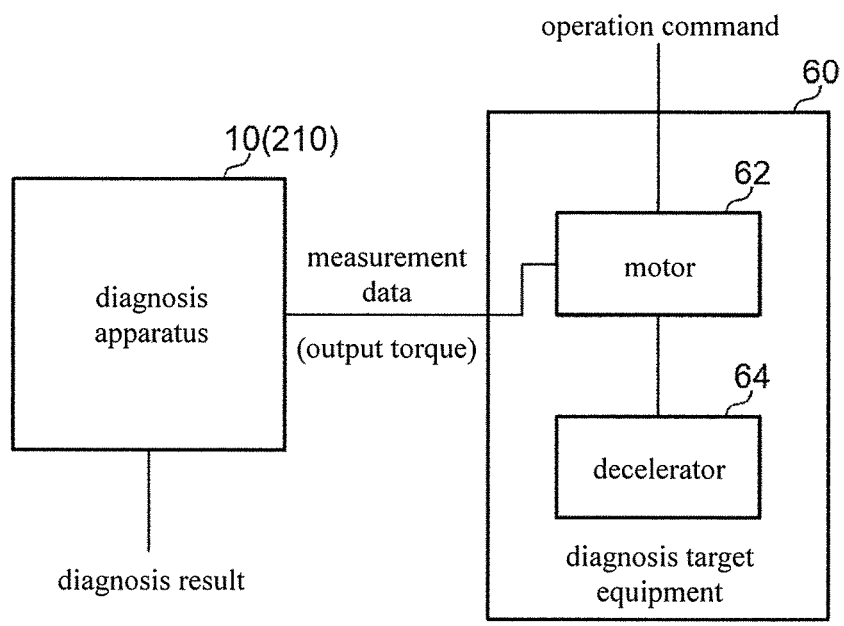
FIG. 2 is a diagram for illustrating a relationship between the diagnosis apparatus and a diagnosis target equipment.

As shown in FIG. 2, the diagnosis apparatus 10 uses a production machine such as a robot or the like as a diagnosis target equipment 60 and diagnoses a scratch. The diagnosis target equipment 60 includes a motor 62 and a decelerator 64.

The motor 62 operates (rotates) a shaft of the bearing mechanism included in the decelerator 64 according to an operation profile generated by a robot control apparatus (not shown) based on an operation command input by a user. The operation profile is an acceleration/deceleration profile, a motion profile, or the like, and refers to characteristics and conditions such as speed, acceleration/deceleration, and the like in the operation of the motor 62. For example, the operation profile is represented as a change in the speed with respect to time such as a trapezoidal acceleration/deceleration or the like.

The decelerator 64 includes a bearing mechanism. In the embodiment, as the bearing mechanism, a wave gear device widely used as a decelerator of a robot is described as a main example.

Figure 3:
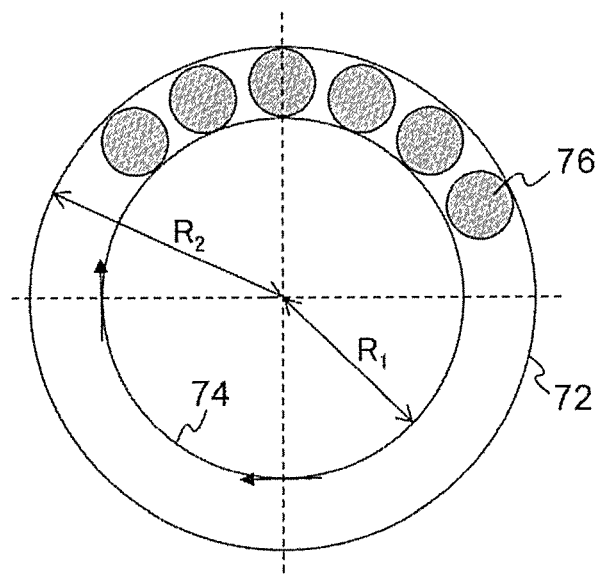
FIG. 3 is a diagram showing a schematic configuration of a bearing.
Figure 4:
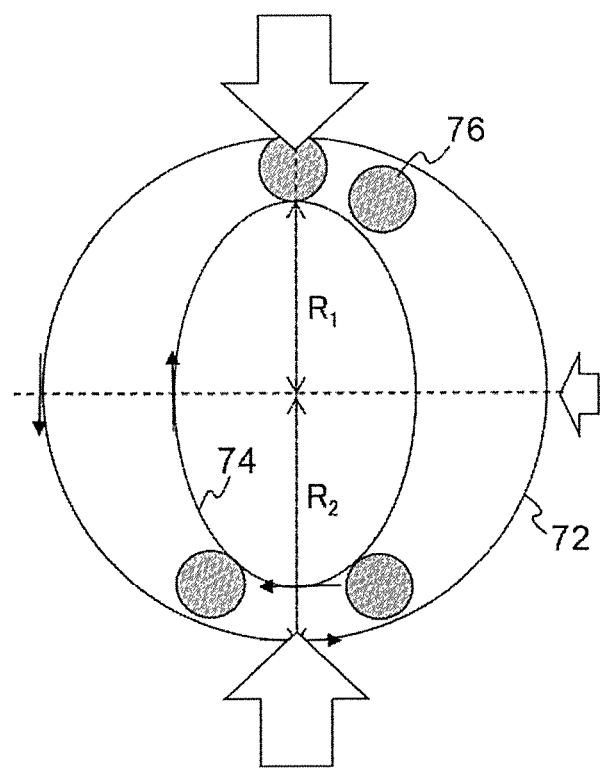
FIG. 4 is a diagram showing a schematic configuration of a wave gear device.

As shown in FIG. 3, a general bearing mechanism (bearing) includes rolling elements 76 between an outer ring 72 and an inner ring 74, and a ball bearing (the shape of the inner ring 74) is a perfect circle. On the other hand, as shown in FIG. 4, the wave gear device is similar to the general bearing in terms of including the rolling elements 76 between the outer ring 72 and the inner ring 74, but the ball bearing is elliptical. Thereby, vibration periodicity is different from that of the general bearing mechanism. The deterioration diagnosis of the wave gear device has many points in common with the general bearing mechanism, but in the embodiment, diagnosis focusing on difference in the vibration periodicity is performed.

Here, the basic principle of the deterioration diagnosis according to vibrations using the bearing mechanism as a target is described.

Figure 5:
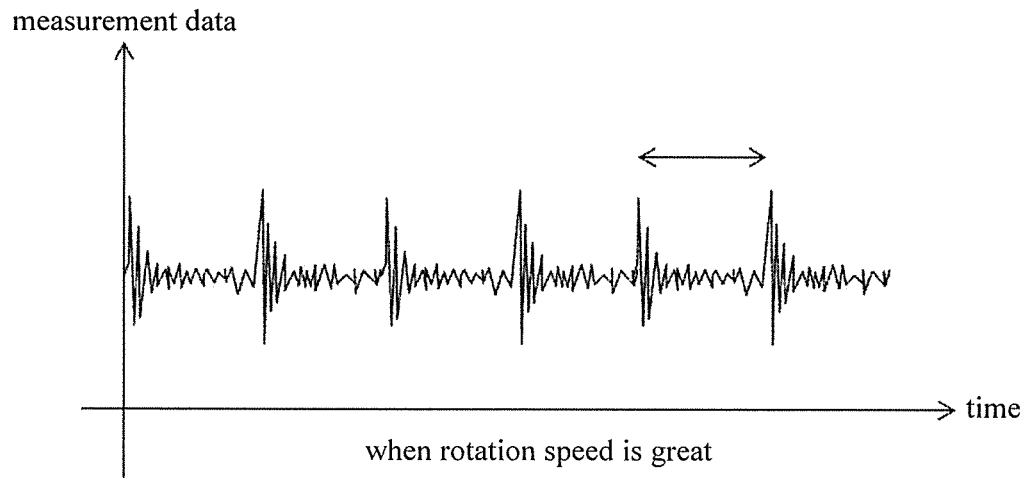
FIG. 5 is a diagram showing an example of measurement data.
Figure 5:
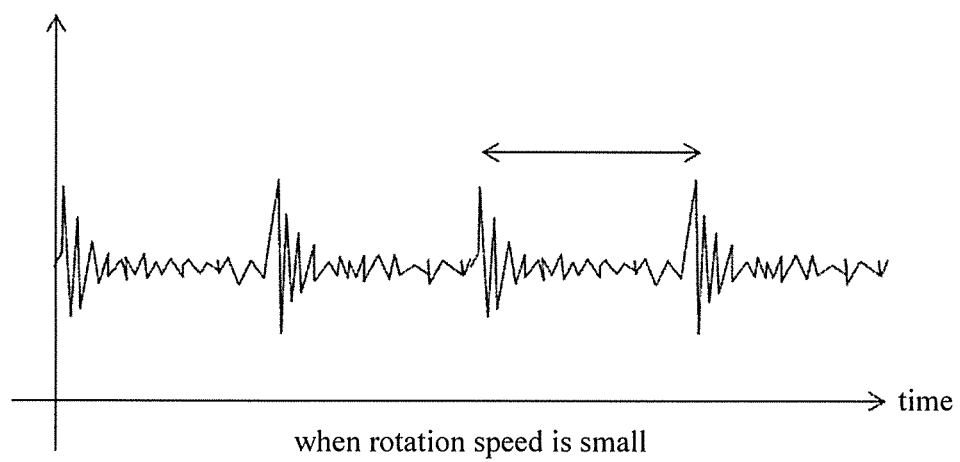

FIG. 5 shows an example of measurement data relating to the vibrations corresponding to rotation of the bearing mechanism such as an output torque of the motor 62, a vibration of the shaft, and the like. When a scratch is generated on the outer ring 72 or the inner ring 74 of the bearing mechanism, the scratch vibrates every time the rolling elements 76 pass through the location of the scratch, and as shown in FIG. 5, the vibration is represented as periodic changes of the measurement data according to the rotation speed of the shaft. Thus, with respect to the measurement data, frequency analysis such as fast Fourier transform (FFT) or the like is performed, and whether a peak of a spectrum appears at the specific frequency corresponding to each of the outer ring 72 and the inner ring 74, the size of the peak, or the like is analyzed to thereby diagnose presence or absence of the scratch.

Next, functional configurations of the diagnosis apparatus 10 according to the first embodiment are described.

Figure 6:
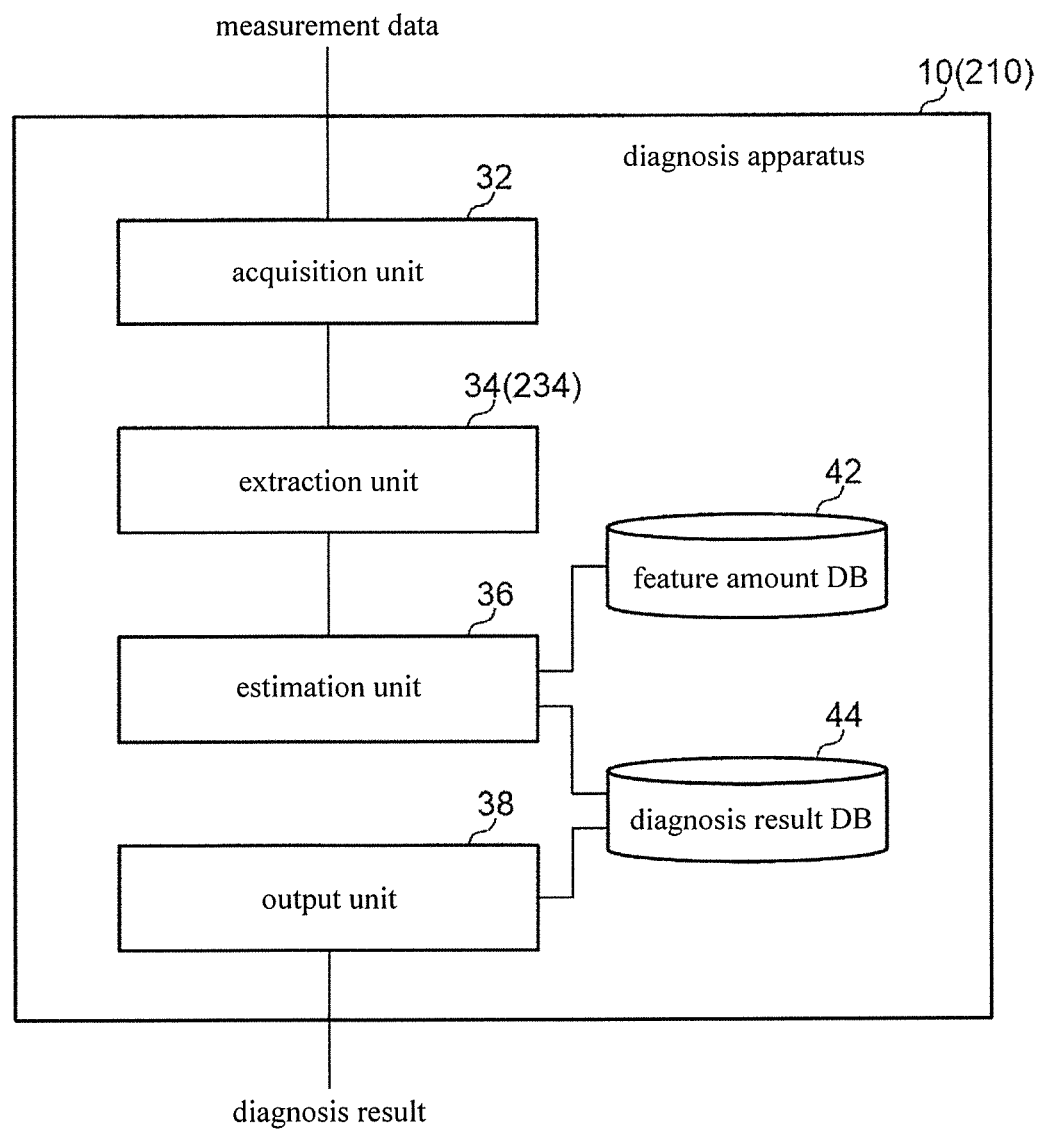
FIG. 6 is a block diagram illustrating an example of functional configurations of the diagnosis apparatus.

FIG. 6 is a block diagram showing an example of the functional configurations of the diagnosis apparatus 10. As shown in FIG. 6, the diagnosis apparatus 10 includes, as the functional configurations, an acquisition unit 32, an extraction unit 34, an estimation unit 36, and an output unit 38. In addition, in a predetermined storage region of the diagnosis apparatus 10, a feature amount DB (Data base) 42 and a diagnosis result DB 44 are stored. Each functional configuration is realized in a manner that the CPU 12 reads out the diagnosis program stored in the storage device 16 and expands the diagnosis program in the memory 14 to perform the diagnosis program.

Figure 7:
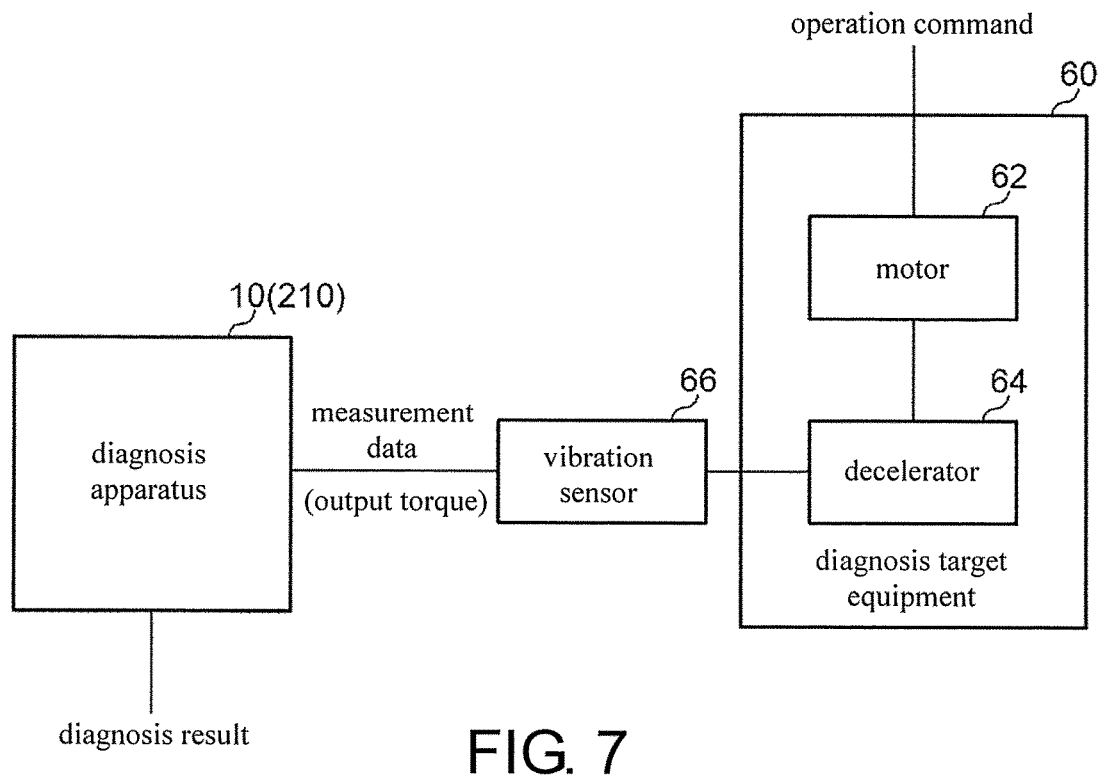
FIG. 7 is a diagram for illustrating a relationship between the diagnosis apparatus and the diagnosis target equipment.

The acquisition unit 32 acquires, from the diagnosis target equipment 60, the measurement data for monitoring the state of the bearing mechanism, which is data relating to the vibrations corresponding to the rotation of the bearing mechanism. The measurement data can be data that is easy to collect, such as motor current and the like. Moreover, in the example in FIG. 2, a case is shown in which the output torque indicated by the motor current value is acquired as the measurement data of the motor 62, but the disclosure is not limited thereto. For example, as shown in FIG. 7, a vibration sensor 66 that detects the vibration of the decelerator 64 is arranged, and the acquisition unit 32 may acquire sensor output from the vibration sensor 66 as the measurement data or may acquire other data such as encoder data or the like as the measurement data. The acquisition unit 32 transfers the acquired measurement data to the extraction unit 34.

The extraction unit 34 performs frequency-analysis on the measurement data transferred from the acquisition unit 32 by FFT or the like, and extracts a feature amount from the analysis result Specifically, in the result of the frequency analysis of the measurement data, the extraction unit 34 extracts, as a feature amount corresponding to a scratch generated on the outer ring 72 (hereinafter referred to as "outer ring scratch feature amount"), an amplitude of a frequency predetermined as a frequency at which a peak occurs when the scratch is generated on the outer ring 72. In addition, the extraction unit 34 extracts, as a feature amount corresponding to a scratch generated on the inner ring 74 (hereinafter referred to as "inner ring scratch feature amount"), an amplitude of a frequency predetermined as a frequency at which a peak occurs when the scratch is generated on the inner ring 74.

The outer ring scratch feature amount and the inner ring scratch feature amount are more specifically described.

In the bearing in which the shape of the inner ring 74 is a perfect circle, the inner ring 74 rotates but the outer ring 72 is fixed. From the structure of this decelerator 64 and a rotation frequency $f_{rot}$ of the motor 62, a frequency of the vibration caused by the rolling elements 76 passing over the scratch on the inner ring 74 (hereinafter referred to as "inner ring scratch frequency") $f_{in}$ is specified by the following equation (1). In addition, a frequency of the vibration caused by the rolling elements 76 passing over the scratch on the outer ring 72 (hereinafter referred to as "outer ring scratch frequency") $f_{out}$ is specified by the following equation (2).

[Formula 1]

$$f_{in} = \frac{R_2(1+C)}{R_1 + R_2} \cdot N \cdot f_{rot} \quad (1)$$

$$f_{out} = \frac{R_1(1+C)}{R_1 + R_2} \cdot N \cdot f_{rot} \quad (2)$$

Here, $R_1$ is the radius of the inner ring 74, $R_2$ is the radius of the outer ring 72 (see FIG. 3), N is the number of the rolling elements 76, and C is a deceleration ratio (0 in the case of a bearing).

In the wave gear device, the shape of the inner ring 74 is elliptical. In addition, in the wave gear device, the inner ring 74 is rotated at the rotation speed of the motor 62, and the outer ring 72 is reversely rotated at a speed of the C (the deceleration ratio). Therefore, in the wave gear device, a theory similar to that of the bearing is established with the inner ring scratch frequency $f_{in}$ and the outer ring scratch frequency $f_{out}$, and the scratch generated on the outer ring 72 can be observed even at twice the rotation frequency ($2f_{rot}$).

Specifically, in the wave gear device, as shown in FIG. 4, a strong force is always applied in a major axis direction, and thus the inner ring 74 is easily scratched in the major axis direction. As shown in the upper diagram of FIG. 8, the scratch formed in the major axis direction vibrates every time the rolling elements 76 pass through, and the frequency of the vibration substantially agrees with the above equation (1).

Figure 8:
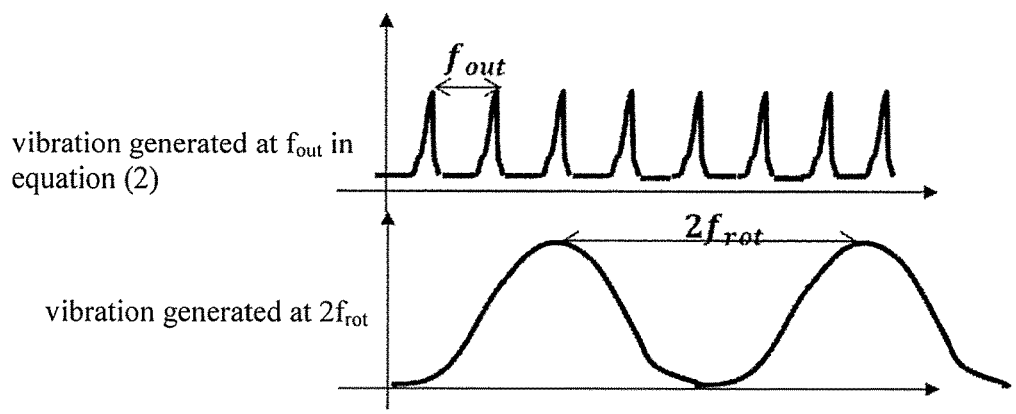
FIG. 8 is a diagram for illustrating a relationship between an outer ring scratch frequency and a rotation frequency.
Figure 8:

On the other hand, in the outer ring 72, as shown in the middle diagram of FIG. 8, a strong force is applied only when the inner ring 74 makes one rotation at the rotation frequency $f_{rot}$ in the major axis direction. Thus, as shown in the lower diagram of FIG. 8, the scratch vibrates only when the rolling elements 76 pass over the scratch and the major axis direction of the inner ring 74 passes over the scratch. Therefore, some vibrations are difficult to be observed at the outer ring scratch frequency $f_{out}$, whereas the vibration due to the scratch can be observed even at twice the rotation frequency ($2f_{rot}$).

Based on the above, the extraction unit 34 extracts, from the result of the frequency analysis, amplitudes (power values of the spectrum) in each of the inner ring scratch frequency $f_{in}$ and the outer ring scratch frequency $f_{out}$ shown in the following table as the inner ring scratch feature amount and the outer ring scratch feature amount.

TABLE 1

| | Bearing (perfectly circular) | Wave gear device (elliptical) |
|---|---|---|
| Inner ring scratch frequency $f_{in}$ | $f_{in} = \frac{R_2}{R_1 + R_2} \cdot N \cdot f_{rot}$ | $f_{in} = \frac{R_2(1+C)}{R_1 + R_2} \cdot N \cdot f_{rot}$ |
| Outer ring scratch frequency $f_{out}$ | $f_{out} = \frac{R_1}{R_1 + R_2} \cdot N \cdot f_{rot}$ | $f_{out} = \frac{R_1(1+C)}{R_1 + R_2} \cdot N \cdot f_{rot}$ |
| | | $f_{out} = 2f_{rot}$ |

Moreover, as the outer ring scratch frequency in the wave gear device, any one of the two $f_{out}$ described in the above table may be employed and monitored. In addition, both frequencies may be monitored, and one of the frequencies may be employed based on the magnitude of the extracted outer ring scratch feature amount and the like. Moreover, compared to the case of $2f_{rot}$, the state of the scratch can be finely monitored at the $f_{out}$ shown by the equation (2). In the following embodiment, the case when $f_{out}=2f_{rot}$ is employed as the outer ring scratch frequency is described.

The extraction unit 34 transfers the outer ring scratch feature amount and the inner ring scratch feature amount extracted from the result of the frequency analysis of measurement data for a constant time to the estimation unit 36 every predetermined time (for example, 10 minutes to 1 hour).

The estimation unit 36 estimates on which of the outer ring 72 and the inner ring 74 is the scratch generated based on a predetermined relationship between a change of the feature amount and the size of the scratch generated on the outer ring 72 or the inner ring 74, and based on the feature amount transferred from the extraction unit 34. In addition, when the scratch is generated on any of the outer ring 72 and the inner ring 74, the estimation unit 36 estimates the size of the scratch generated on the outer ring 72 or the inner ring 74.

Here, in order to describe the relationship between the feature amount and the size of the scratch, first, the vibration when the rolling elements 76 pass through the location of the scratch, that is, the basic of the change in the measurement data is described. Moreover, although the magnitude of the measurement data has a relationship with the depth of the scratch, in the following description, the depth of the scratch is regarded as constant.

Figure 9:
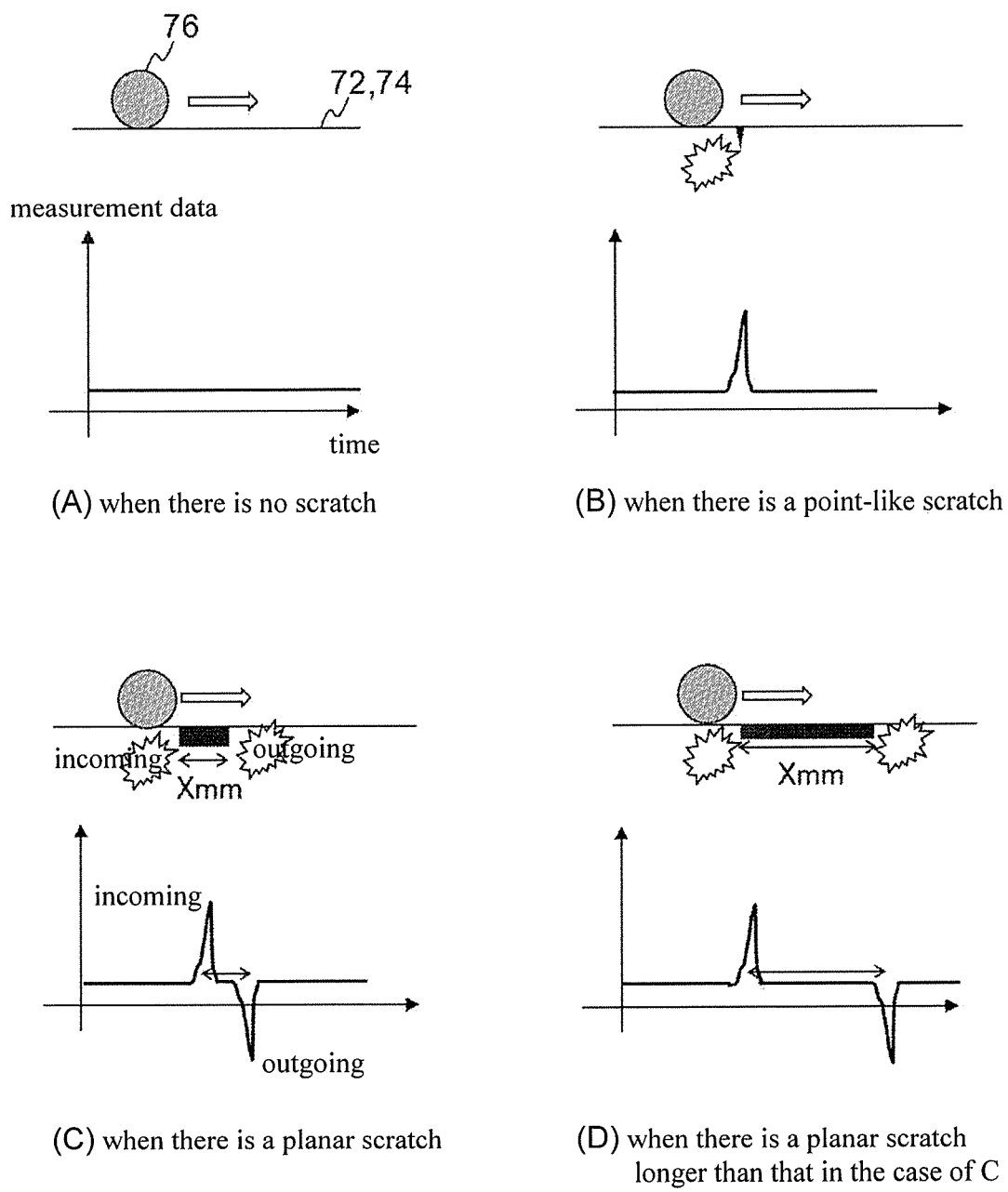
FIG. 9 is a diagram for illustrating a relationship between a scratch generated on an inner ring or an outer ring and the measurement data.

As shown in (A) of FIG. 9, when no scratch is generated on the outer ring 72 or the inner ring 74, the measurement data is flat data. As shown in (B) of FIG. 9, when a point-like scratch is generated on the outer ring 72 or the inner ring 74, the value of the measurement data greatly changes during the time when the rolling elements 76 pass through the location of the scratch. In addition, as shown in (C) and (D) of FIG. 9, when a planar scratch having a size X [mm] is generated on the outer ring 72 or the inner ring 74, the value of the measurement data greatly changes at the time point when the rolling elements 76 enter the location of the scratch from a location with no scratch. Hereinafter, this change is also referred to as "incoming vibration". Besides, at the time point when the rolling elements 76 go out from the location of the scratch to the location with no scratch, the measurement data greatly changes on a side opposite to the incoming vibration. Hereinafter, this change is also referred to as "outgoing vibration".

Figure 10:
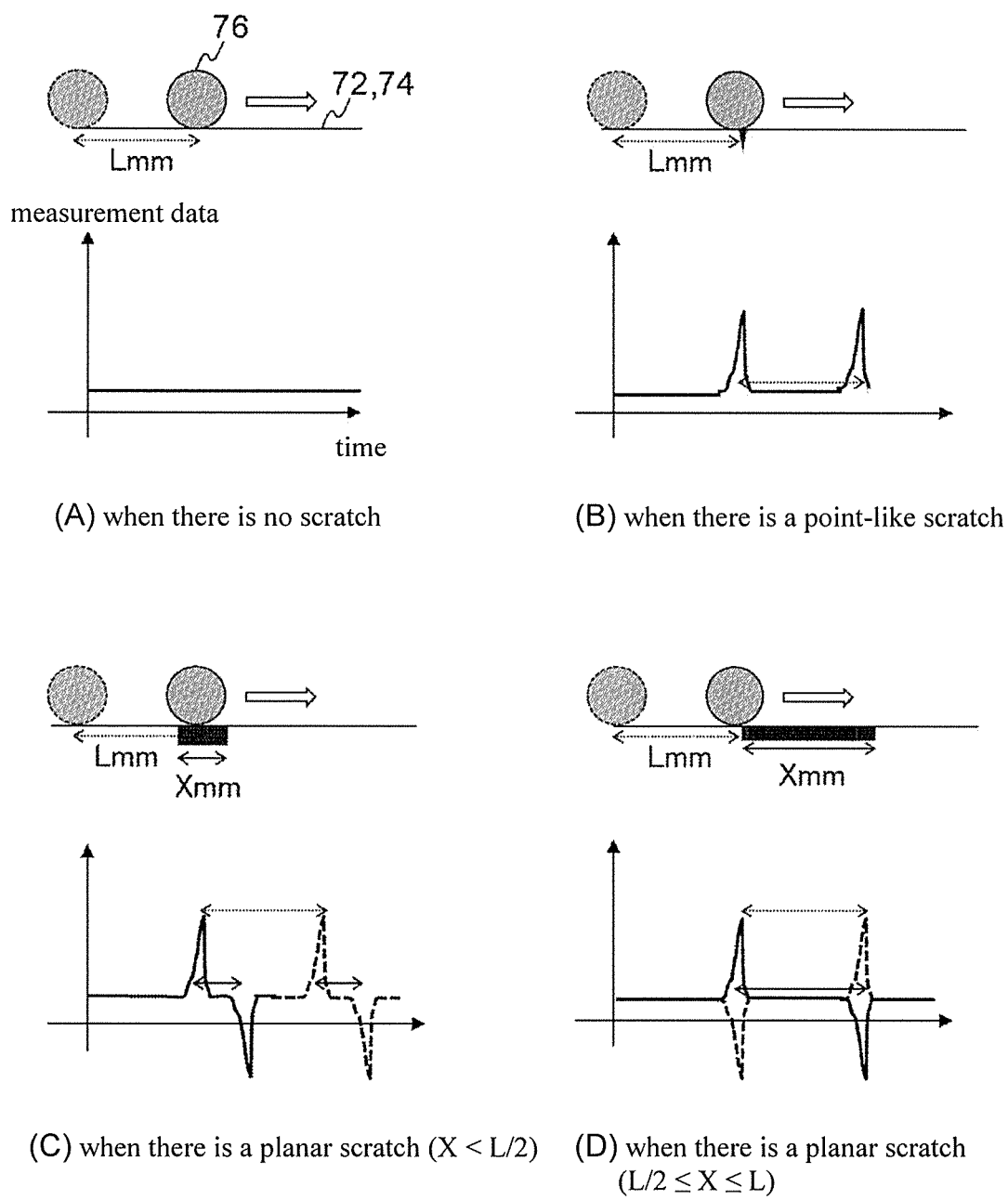
FIG. 10 is a diagram for illustrating the measurement data in a case that rolling elements continuously pass through a scratch generated on the inner ring or the outer ring.

FIG. 10 shows a case that the rolling elements 76 continuously pass through the location of the scratch in a case of the scratch similar to (A) of FIG. 9 to (D) of FIG. 9. A distance between the rolling elements is L [mm].

In the case of (A) of FIG. 10, the measurement data becomes flat data similar as in the case of (A) of FIG. 9. In the case of (B) of FIG. 10, the value of the measurement data continuously changes during the time when each of the rolling elements 76 passes through the location of the scratch. In addition, as shown in (C) of FIG. 10, when the size X [mm] of the scratch is considerably smaller than the distance L [mm] between the rolling elements, specifically, when $X<L/2$, the incoming vibration of a certain rolling element 76 and the outgoing vibration of another rolling element 76 continuously occur without canceling each other. When X approaches $L/2$, the incoming vibration and the outgoing vibration appear at equal intervals due to the rolling elements 76 moving in and out of the scratch. Thus, when the frequency analysis is performed, an amplitude at a specific frequency is maximized.

In addition, as shown in (D) of FIG. 10, when X approaches L, the tendency of the incoming vibration of a certain rolling element 76 and the outgoing vibration of another rolling element 76 cancelling each other out becomes strong. Particularly when $X=L$, timing of the incoming vibration of a certain rolling element 76 matches timing of the outgoing vibration of another rolling element 76, and thus the measurement data cancel each other out, and when the frequency analysis is performed, the amplitude at the specific frequency is minimized.

Figure 11:
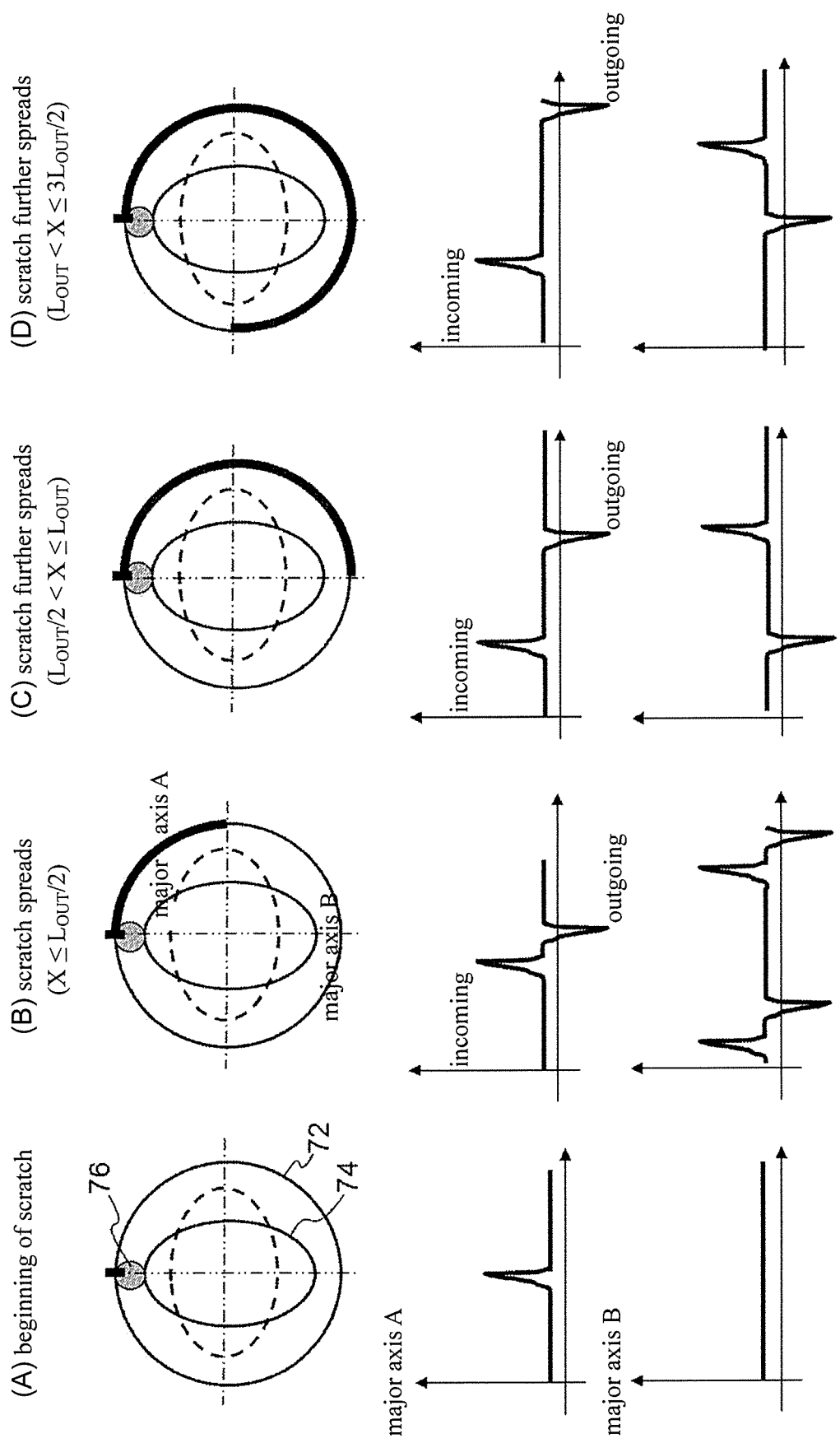
FIG. 11 is a diagram for illustrating a relationship between a scratch generated on the outer ring and the measurement data.

Next, a change in the measurement data when the scratch is generated on the outer ring 72 in the wave gear device is described. As shown in FIG. 11, one side of the major axis of the elliptical inner ring 74 is set as a major axis A, the other side is set as a major axis B, and ½ of an outer ring circumference is set as $L_{OUT}$. In FIG. 11, the measurement data is shown by being decomposed into data showing the vibration when the major axis A passes through the position of the scratch (hereinafter referred to as "measurement data of the major axis A") and data showing the vibration when the major axis B passes through the position of the scratch (hereinafter referred to as "measurement data of the major axis B"). The measurement data actually measured is the sum of both.

As shown in (A) of FIG. 11, when the major axis A passes through the position of the scratch and the rolling elements 76 pass through the location of the scratch at the beginning of the scratch, the measurement data of the major axis A changes greatly, and the measurement data of the major axis B is flat. As shown in (B) of FIG. 11, in a range where the scratch spreads and the size X of the scratch is $X \leq L_{OUT}/2$, the timings of the incoming and the outgoing to and from the scratch are shifted in the major axis A and the major axis B, and thus the incoming vibration and the outgoing vibration do not overlap in the measurement data of the major axis A and the measurement data of the major axis B. As shown in (C) of FIG. 11, in a range where the scratch further spreads and $L_{OUT}/2 < X \leq L_{OUT}$, the timings of the incoming and the outgoing to and from the scratch overlap in the major axis A and the major axis B, and thus the incoming vibration and the outgoing vibration overlap, and the tendency of the measurement data of the major axis A and the measurement data of the major axis B cancelling each other out becomes strong. As shown in (D) of FIG. 11, in a range where the scratch further spreads and $L_{OUT} < X \leq 3L_{OUT}/2$, the timings of the incoming and the outgoing to and from the scratch are reversed in the major axis A and the major axis B, and the measurement data has a waveform similar to that in (B) of FIG. 11.

Next, a change in the measurement data when the scratch is generated in the inner ring 74 in the bearing mechanism is described. The case of one scratch is similar as the basic case shown in FIGS. 9 and 10.

Figure 12:
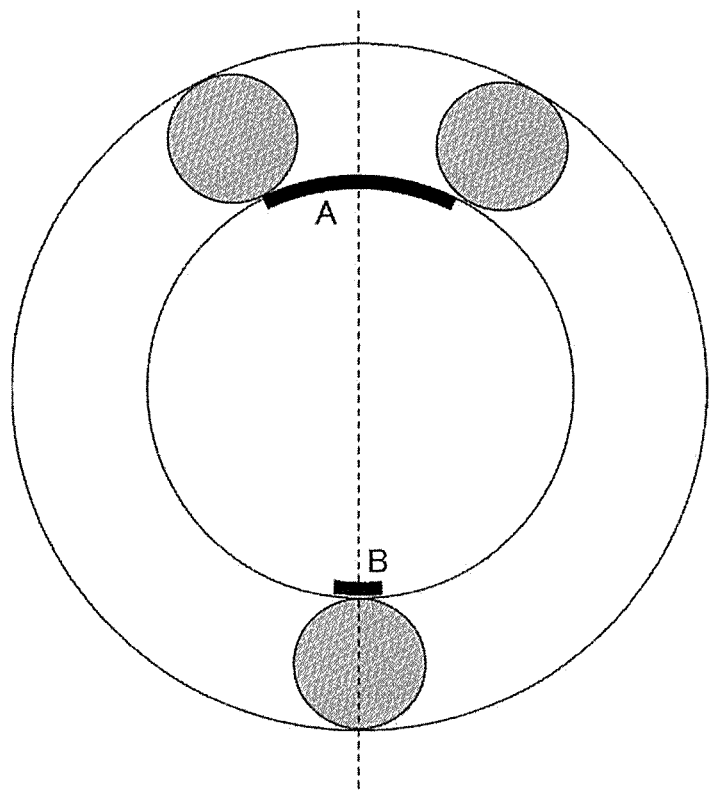
FIG. 12 is a diagram for illustrating two scratches generated in the wave gear device.

As a premise, it is assumed that one scratch is generated first and then the second scratch is generated at certain timing. In addition, as shown in FIG. 12, the two scratches are generated at positions approximately facing each other in the major axis direction. The scratch generated earlier is called a scratch A and the scratch generated later is called a scratch B. When the scratches are positioned on the completely opposite sides and the number of the rolling elements 76 is an odd number, a phase of the change in the measurement data corresponding to the rolling elements 76 entering each of the scratch A and the scratch B is shifted by 180 degrees.

Figure 13:
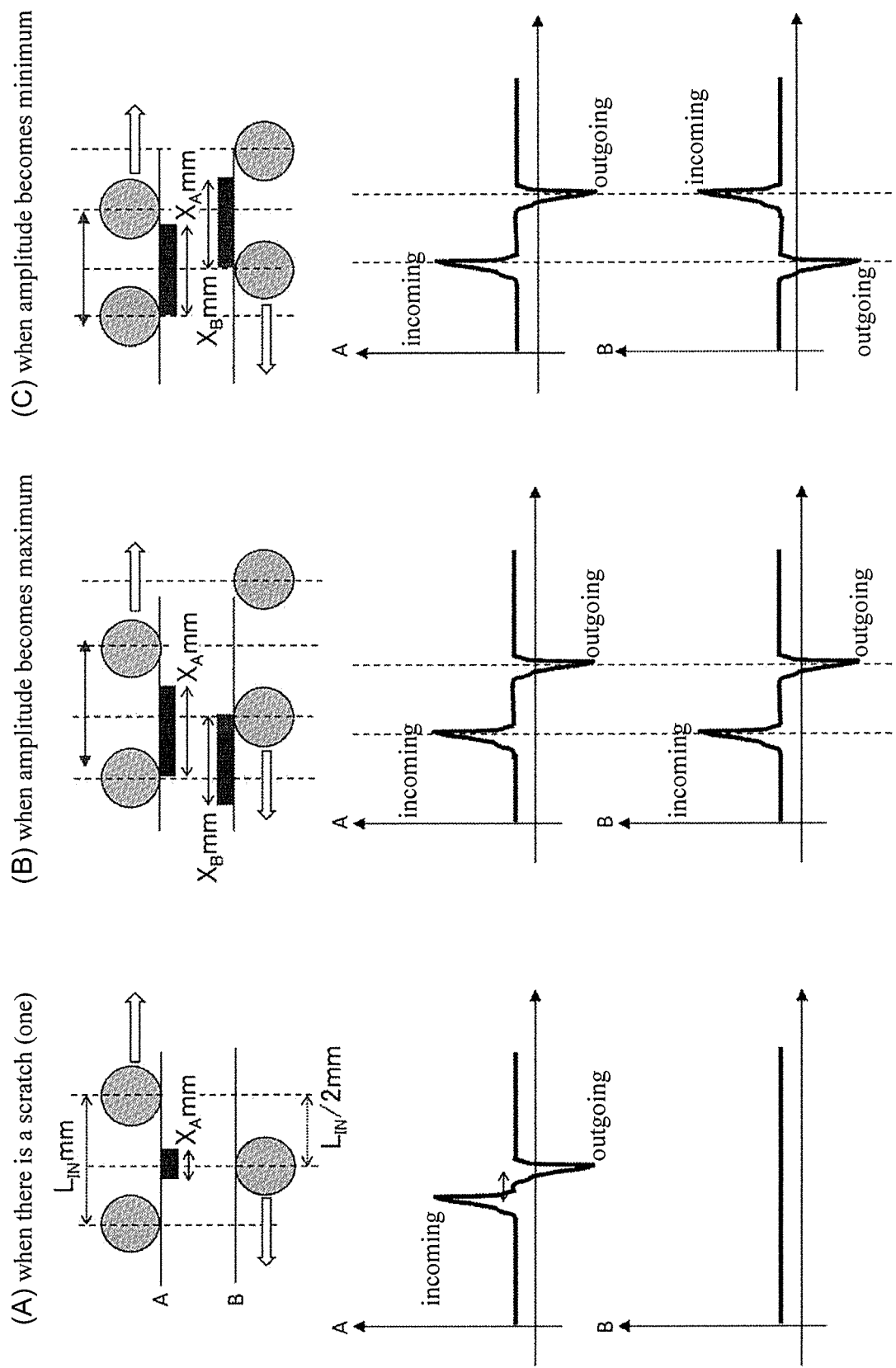
FIG. 13 is a diagram for illustrating a relationship between a scratch generated on the inner ring and the measurement data.

In FIG. 13, the measurement data is shown by being decomposed into data showing the vibration when the rolling elements 76 pass through the scratch A (hereinafter referred to as "measurement data of the scratch A") and data showing the vibration when the rolling elements 76 pass through the scratch B (hereinafter referred to as "measurement data of the scratch B"). The measurement data actually measured is the sum of both.

As shown in (A) of FIG. 13, in the case of one scratch, when the rolling elements 76 pass through the location of the scratch A, the measurement data of the scratch A greatly changes and the measurement data of the scratch B is flat. As shown in (B) of FIG. 13, in a case that the timing of the incoming of a certain rolling element 76 into the scratch A matches the timing of the incoming of another rolling element 76 into the scratch B, incoming vibrations overlap, and thus the measurement data changes greatly when the two are added together. In addition, a case that the timing of the outgoing of a certain rolling element 76 from the scratch A matches the timing of the outgoing of another rolling element 76 from the scratch B is also similar. When the former case and the latter case occur at the same time, a maximum change in the measurement data is reached. In this case, in the result of the frequency analysis, the amplitude at the specified frequency is maximized.

On the other hand, as shown in (C) of FIG. 13, in a case that the timing of the incoming of a certain rolling element 76 into the scratch A matches the timing of the outgoing of another rolling element 76 from the scratch B, the incoming vibration and the outgoing vibration overlap, and thus the measurement data cancel each other out. A case that the timing of the outgoing of a certain rolling element 76 from the scratch A matches the timing of the incoming of another rolling element 76 into the scratch B is also similar. When the former case and the latter case occur at the same time, a maximum change in the measurement data is reached. In this case, in the result of the frequency analysis, the amplitude at the specified frequency is minimized.

Similarly, in a case that the timing of the incoming of a certain rolling element 76 into the scratch A matches the timing of the outgoing of another rolling element 76 from the scratch A, the incoming vibration and the outgoing vibration overlap, and thus the measurement data cancel each other out. A case that the timing of the outgoing of a certain rolling element 76 from the scratch B matches the timing of the incoming of another rolling element 76 into the scratch B is also similar. When the former case and the latter case occur at the same time, a maximum change in the measurement data is reached. In this case, in the result of the frequency analysis, the amplitude at the specified frequency is minimized.

The above is described more specifically. When the centers of the two scratches are at the positions facing each other in the major axis direction of the inner ring 74 and the scratches are point-like, waveforms of the measurement data of the scratches A and B are represented by the following equations (3) and (4).

$$\text{Scratch } A = ag(f_{in}, 0) \quad (3)$$

$$\text{Scratch } B = bg(f_{in}, \pi) \quad (4)$$

$g(f, 0)$ is a periodic function of a frequency f at which an impulse-like waveform is generated and zero phase, and $g(f, \theta)$ is a periodic function of the frequency f at which a phase of $\theta$[rad] exists. In addition, a and b are amplitudes of the periodic waveform.

The periodic waveform of the scratch A when a scratch of $X_A$ [mm] is generated is an addition of the incoming vibration and the outgoing vibration and is expressed by the following equation (5).

$$\text{Scratch } A = ag(f_{in}, -\theta_A) - ag(f_{in}, +\theta_A) \quad (5)$$

Here, by assumption, the incoming vibration and the outgoing vibration have opposite phases. That is, if the distance between the rolling elements is $L_{IN}$ [mm], when $X_A = L_{IN}$, $\theta_A = \pi$ is established, and as shown in the following equation (6), the incoming vibration and the outgoing vibration cancel each other out and become zero.

$$\text{Scratch } A = ag(f_{in}, -\pi) - ag(f_{in}, +\pi) \quad (6)$$

In other cases, because it is represented as $\theta_A = \pi X_A / L_{IN}$, the periodic waveform of the scratch A is represented by the following equation (7).

$$\text{Scratch } A = ag(f_{in}, -\pi X_A / L_{IN}) - ag(f_{in}, +\pi X_A / L_{IN}) \quad (7)$$

Similarly, the periodic waveform of the scratch B when a scratch of $X_B$ [mm] is generated is expressed by the following equation (8).

$$\text{Scratch } B = bg(f_{in}, \pi - \pi X_B / L_{IN}) - bg(f_{in}, \pi + \pi X_B / L_{IN}) = bg(f_{in}, \pi(1 - X_B / L_{IN})) - bg(f_{in}, \pi(1 + X_B / L_{IN})) \quad (8)$$

From the equations (7) and (8), if two scratches are generated at positions facing each other in the major axis direction of the inner ring 74, and the two scratches have the same depth, when sizes of the scratches meet conditions in the following table, the inner ring scratch feature amount takes a maximum value or a minimum value.

TABLE 2

| The number of scratches | Size of scratch taking a maximum value [mm] | |
|---|---|---|
| 1 | | $(n - \frac{1}{2})L_{IN}$ |
| 2 | ① Phases of incoming periodic waveforms of the scratch A and the scratch B match | $X_B - X_A = nL_{IN}$ |
| | ② Phases of outgoing periodic waveforms of the scratch A and the scratch B match | $X_A - X_B = nL_{IN}$ |
| | [Greatest] ① AND ② | $X_B = X_A$ |

| The number of scratches | Sizes of scratches taking a minimum value [mm] | |
|---|---|---|
| 1 | | $nL_{IN}$ |
| 2 | ① Phases of an incoming periodic waveform of the scratch A and an outgoing periodic waveform of the scratch B match | $X_A + X_B = -nL_{IN} = nL_{IN}$ |
| | ② Phases of an outgoing periodic waveform of the scratch A and an incoming periodic waveform of the scratch B match | $X_A + X_B = nL_{IN}$ |
| | ③ Phases of an incoming periodic waveform of the scratch A and an outgoing periodic waveform of the scratch A match | $X_A = nL_{IN}/2$ |
| | ④ Phases of an incoming periodic waveform of the scratch B and an outgoing periodic waveform of the scratch B match | $X_B = nL_{IN}/2$ |
| | [Smallest] ① AND ② or AND ④ | $X_A = nL_{IN}/2$ AND $X_B = nL_{IN}/2$ wherein, $X_A \neq X_B$ |

Based on the above points, the estimation unit 36 estimates presence or absence of a scratch and the size of the scratch as follows.

Figure 15:
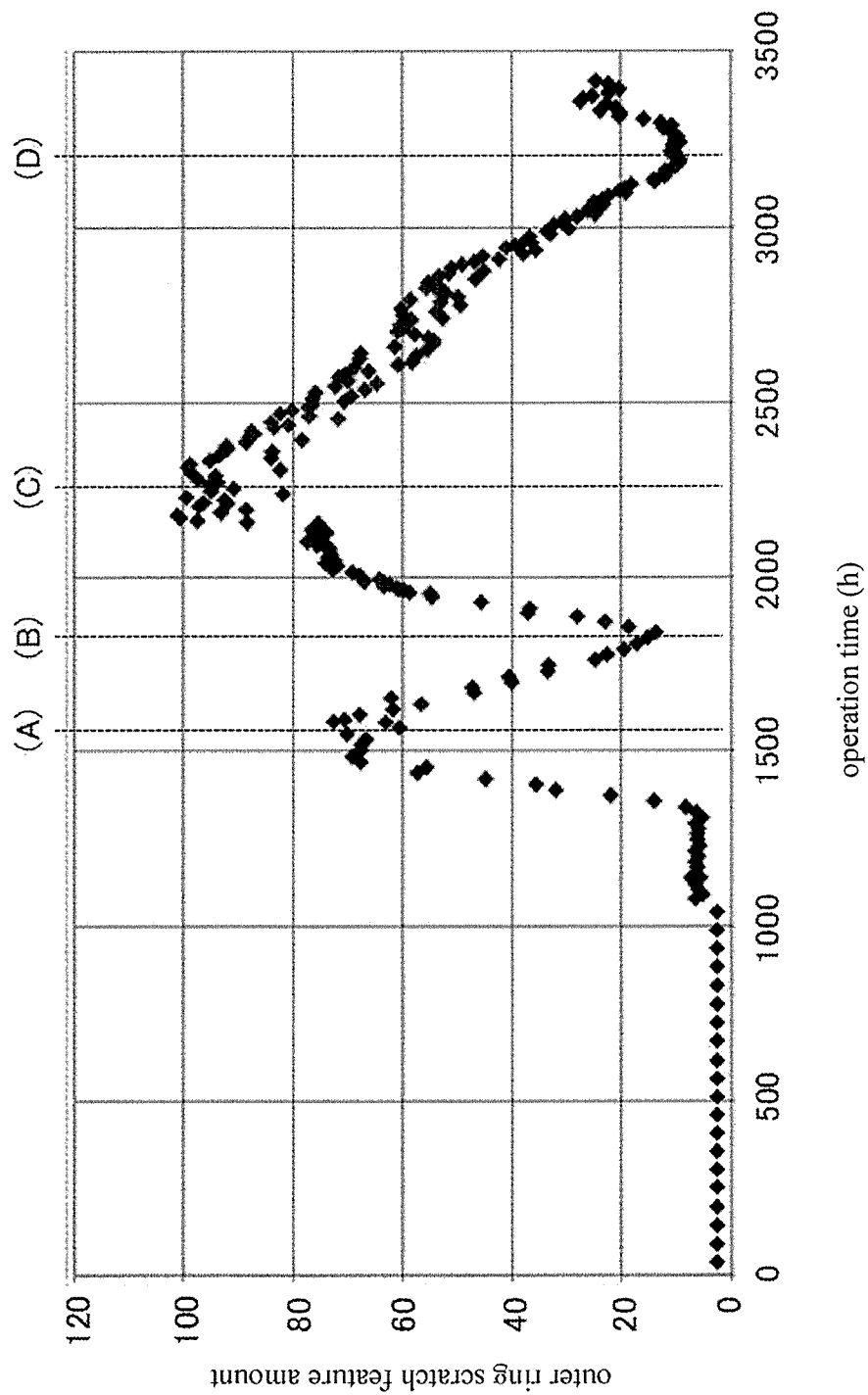
FIG. 15 is a graph showing changes in an outer ring scratch feature amount with respect to operation time.
Figure 16:
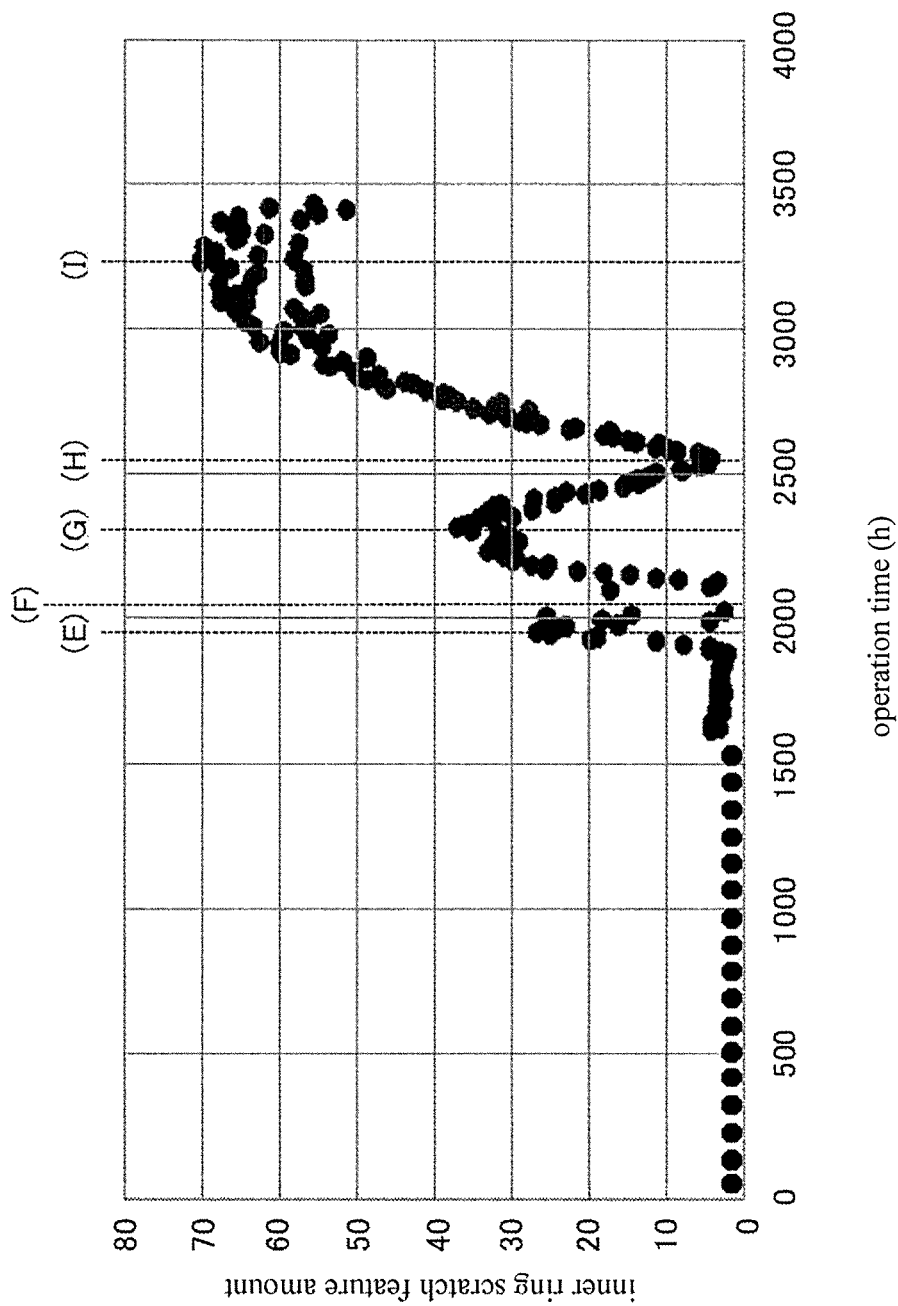
FIG. 16 is a graph showing changes in an inner ring scratch feature amount with respect to operation time.

The estimating unit 36 stores the feature amount transferred from the extraction unit 34 in the feature amount DB 42 as shown in FIG. 14 in association with the operation time of the diagnosis target equipment 60. Then, the estimation unit 36 reads out the outer ring scratch feature amount for each operation time stored in the feature amount DB 42 and plots, as shown in FIG. 15, a change in the outer ring scratch feature amount with respect to the operation time of the diagnosis target equipment 60. Similarly, the estimation unit 36 reads out the inner ring scratch feature amount for each operation time stored in the feature amount DB 42 and plots, as shown in FIG. 16, a change in the inner ring scratch feature amount with respect to the operation time of the diagnosis target equipment 60.

When the outer ring scratch feature amount exceeds a predetermined threshold value for the first time in the change of the outer ring scratch feature amount as shown in FIG. 15, the estimation unit 36 estimates that a scratch is generated on the outer ring 72 and performs estimation processing assuming that the scratch is generated on the outer ring 72 at the time of subsequent diagnosis. Similarly, when the inner ring scratch feature amount exceeds a predetermined threshold value for the first time in the change of the inner ring scratch feature amount as shown in FIG. 16, the estimation unit 36 estimates that a scratch is generated on the inner ring 74 and performs estimation processing assuming that the scratch is generated on the inner ring 74 at the time of subsequent diagnosis.

That is, whether the position of the scratch is on the inner ring or the outer ring can be distinguished according to whether the amplitude of the inner ring scratch frequency $f_{in}$ (the inner ring scratch feature amount) which is the feature amount changes, or the amplitude of the outer ring scratch frequency $f_{out}$ (the outer ring scratch feature amount) changes.

Moreover, in order to estimate whether a scratch is generated, average and variance of each of the outer ring scratch feature amount and the inner ring scratch feature amount during normal time are calculated in advance, and a value of the average+the variance may be used as the above threshold value. In addition, a position where the inner ring scratch feature amount and the outer ring scratch feature amount have a greater ratio of increase from the respective average values during normal time may be estimated as the position of the scratch.

In addition, when the estimation unit 36 estimates that the scratch is generated on the outer ring 72, the estimation unit 36 estimates the size of the scratch at the time point when the outer ring scratch feature amount as shown in FIG. 15 reaches the n-th maximum value to be the size of (n−½) times half the circumference of the outer ring. In addition, the estimation unit 36 estimates the size of the scratch at the time point when the outer ring scratch feature amount reaches the n-th minimum value to be the size of n times half the circumference of the outer ring.

If $L_{OUT}$=0.5×the circumference of the outer ring, in the example of FIG. 15, the size of the outer ring scratch is estimated as follows at each time point (A) to (D).
(A) Time point of the first (n=1) maximum value: the size of the outer ring scratch=0.5 $L_{OUT}$
(B) Time point of the first (n=1) minimum value: the size of the outer ring scratch=1.0 $L_{OUT}$
(C) Time point of the second (n=2) maximum value: the size of the outer ring scratch=1.5 $L_{OUT}$
(D) Time point of the second (n=2) minimum value: the size of the outer ring scratch=2.0 $L_{OUT}$ In addition, when the estimation unit 36 estimates that the scratch is generated on the inner ring 74, the estimation unit 36 estimates the size of the scratch at the time point when the inner ring scratch feature amount as shown in FIG. 16 reaches an initial maximum value to be the size of (n−½) times the distance between the rolling elements. Similarly, the estimation unit 36 estimates the size of the scratch at the time point when the inner ring scratch feature amount reaches the n-th maximum value when a difference between the n-th maximum value and the (n−1)-th maximum value of the inner ring scratch feature amount is less than a predetermined value to be the size of (n−½) times the distance between the rolling elements. Furthermore, the estimation unit 36 estimates the size of the scratch at the time point when the inner ring scratch feature amount reaches the n-th minimum value to be the size of n times the distance between the rolling elements.

In addition, when the difference between the n-th maximum value and the (n−1)-th maximum value of the inner ring scratch feature amount is equal to or greater than the predetermined value, the estimation unit 36 estimates that two scratches are generated on the inner ring 74. In this case, the estimation unit 36 estimates the size of the scratch A (the scratch generated earlier) to be equal to or greater than the size of the scratch at the time of the previous estimation, and estimates the size of the scratch B (the scratch generated later) to be smaller than the size of the scratch A.

When there is one scratch, the n-th maximum value and the (n−1)-th maximum value do not change greatly, and when there are two scratches, the n-th maximum value is a great value compared with the (n−1)-th maximum value. The predetermined value for estimating whether there is one or two scratches may be predetermined as a value that allows this division, or a value of a predetermined ratio (for example, 50%) of the (n−1)-th maximum value.

Specifically, the estimation unit 36 estimates the sizes of the two scratches at the time when the inner ring scratch feature amount reaches the n-th maximum value from combinations of candidate sizes at which a difference between the size of the scratch A and the size of the scratch B is n times the distance between the rolling elements. In addition, the estimation unit 36 estimates the sizes of the two scratches at the time when the inner ring scratch feature amount reaches the n-th minimum value from combinations of candidate sizes at which a sum of the size of the scratch A and the size of the scratch B is n times or n/2 times the distance between the rolling elements.

More specifically, the estimation unit 36 sets the greatest value of the sum of the size $X_A$ of the scratch A and the size $X_B$ of the scratch B as a value of the circumference of the inner ring, and sets combinations of $X_A$ and $X_B$ according to the conditions in the above Table 2 as the combinations of the candidate sizes.

In addition, the estimation unit 36 may set the greatest value of the sum of $X_A$ and $X_B$ as the size of a scratch at the time point of reaching the n-th maximum value or minimum value predicted based on the change of the inner ring scratch feature amount in the past. For example, the size of the scratch is increased by $\Delta X_{1-2}$ during $\Delta T_{1-2}$ of operation times T1 to T2, and the size of the scratch at the time point of the operation time T2 is set as $X_{T2}$. In this case, a size $X_{T3}$ of a scratch at the time point of an operation time T3 can be predicted by the following equation (9).

$$X_{T3}=X_{T2}+(\Delta X_{1-2} \times \Delta T_{2-3})/\Delta T_{1-2}$$

In this case, the estimation unit 36 can set the greatest value of the sum of $X_A$ and $X_B$ as $X_{T3}$, and set the combinations of $X_A$ and $X_B$ according to the conditions in the above Table 2 as the combinations of the candidate sizes. Thereby, the combinations of the candidate sizes can be suppressed from becoming huge. Moreover, the greatest value of the sum of $X_A$ and $X_B$ may be a value obtained by adding a margin to $X_{T3}$.

The estimation unit 36 estimates, for example, the greatest value or the average value of the combinations of the candidate sizes to be the sizes of the scratch A and the scratch B.

If the distance between the rolling elements $L_{IN}$=8 [mm], in the example of FIG. 16, the size of the inner ring scratch is estimated as follows at each time point (E) to (I).

(E) Time point of the first (n=1) maximum value:
One scratch . . . the size of the inner ring scratch=0.5 $L_{IN}$=4 mm (F) Time point of the first (n=1) minimum value:
One scratch . . . the size of the inner ring scratch=1.0 $L_{IN}$=8 mm (G) Second (n=2) maximum value, and difference with the maximum value at (E) is less than the predetermined value:
One scratch . . . the size of the inner ring scratch=1.5 $L_{IN}$=12 mm (H) Time point of the second (n=2) minimum value:
One scratch . . . the size of the inner ring scratch=2.0 $L_{IN}$=16 mm (I) Third (n=3) maximum value, and difference with the maximum value at (G) is equal to or greater than the predetermined value:
Two scratches . . . estimated from the following combinations of candidate sizes In the case of (I), the period from (E) to (H) is approximately 600 hours, during which the size of the scratch A is increased by 12 mm, and the period from (H) to (I) is approximately 600 hours. Utilizing this, the greatest value of the sum of the size $X_A$ of the scratch A and the size $X_B$ of the scratch B at the time point of (I) is 12 mm×2 (for two scratches)+16 mm ($X_A$ at the time point of (H))=40 mm. In addition, $X_A$ is equal to or greater than 16 mm which is the size at the time point of (H), $X_B$ is smaller than $X_A$, and $X_A-X_B$=3×8=24 mm from the condition "$X_A-X_B$=n $L_{IN}$" in Table 2. Thus, when the candidate size is 1 mm unit, each of the following combinations ($X_A$, $X_B$) becomes the candidate size.

(25, 1), (26, 2), (27, 3), (28, 4),
(29, 5), (30, 6), (31, 7), (32, 8)

If the greatest value is selected from the combinations of the candidate sizes, $X_A$ is estimated to be 32 mm and $X_B$ is estimated to be 8 mm. In addition, when the average value is taken, $X_A$ is estimated to be 28.5 mm, and $X_B$ is estimated to be 4.5 mm.

Moreover, when $f_{out}$ of the above equation (2) is employed as the outer ring scratch frequency, the estimation unit 36 can estimate the size of the inner ring scratch in a similar way as the size of the outer ring scratch.

The estimation unit 36 stores the estimated position of the scratch (the outer ring 72 or the inner ring 74) and the size of the scratch as the diagnosis result in, for example, the diagnosis result DB 44 as shown in FIG. 17 in association with the operation time.

The output unit 38 outputs the diagnosis result stored in the diagnosis result DB 44. The diagnosis result to be output may be only the most recent diagnosis result or may be output together with past diagnosis results. As an output method, any method such as screen display on a display, voice output from a speaker, printing on a form by a printer, or the like can be used.

Next, actions of the diagnosis apparatus 10 according to the first embodiment are described.

Figure 18:
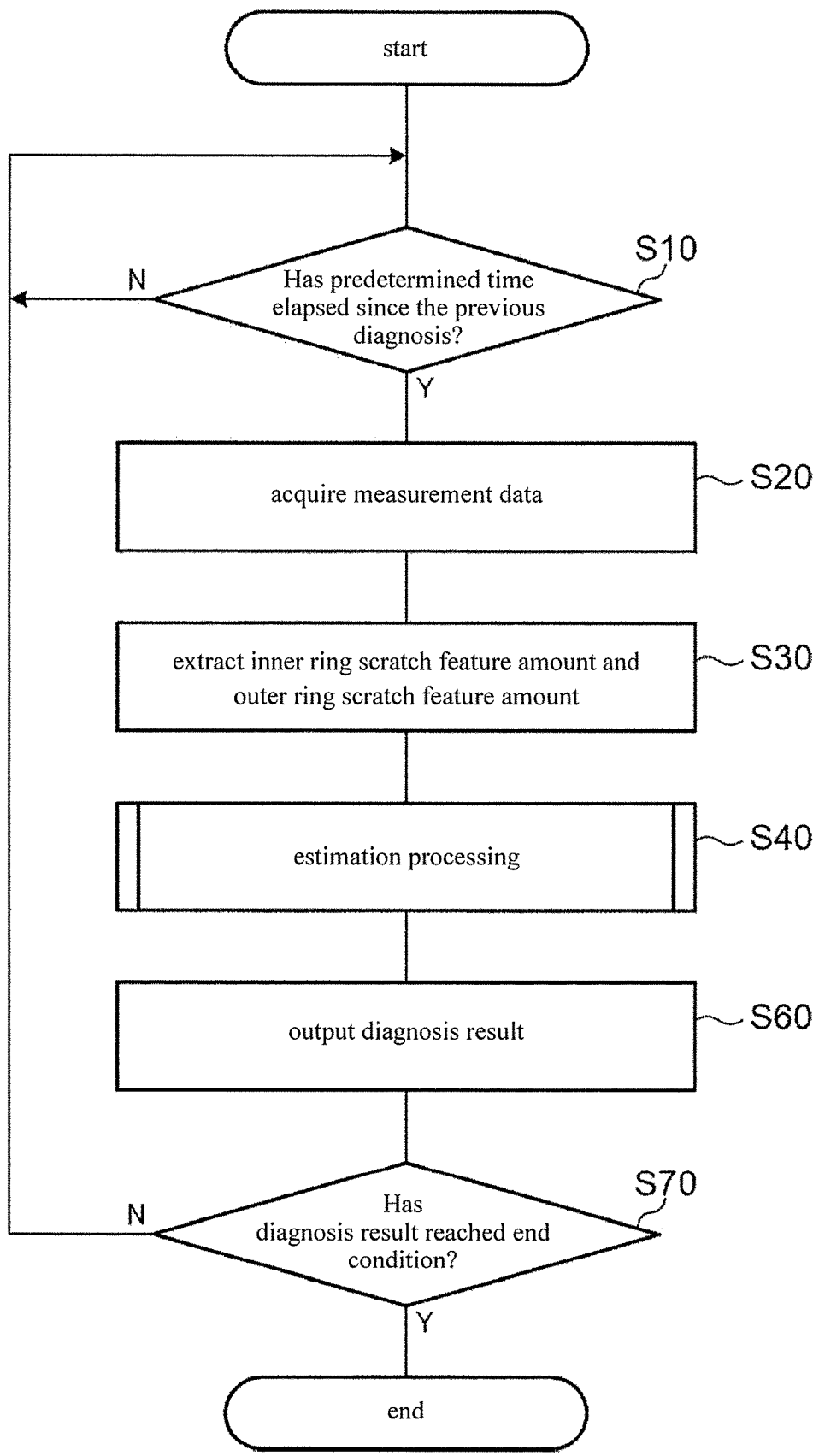
FIG. 18 is a flowchart showing an example of diagnosis processing in a first embodiment.

FIG. 18 is a flowchart showing the flow of the diagnosis processing executed by the CPU 12 of the diagnosis apparatus 10. The CPU 12 reads out the diagnosis program from the storage device 16 and expands the diagnosis program in the memory 14 to perform the diagnosis program, and thereby the CPU 12 functions as each functional configuration of the diagnosis apparatus 10, and the diagnosis processing shown in FIG. 18 is performed.

In step S10, the acquisition unit 32 determines whether a predetermined time (for example, 10 minutes to 1 hour) has elapsed since the previous execution of the diagnosis processing. When the predetermined time has elapsed, the processing proceeds to step S20, and when the predetermined time does not elapse, the determination in this step is repeated.

In step S20, the acquisition unit 32 acquires, for example, the measurement data such as the output torque of the motor 62 or the like as data relating to the vibrations corresponding to the rotation of the bearing mechanism from the diagnosis target equipment 60.

Next, in step S30, the extraction unit 34 performs frequency-analysis by FFT or the like on the measurement data acquired by the acquisition unit 32. Then, from the result of the frequency analysis, the extraction unit 34 extracts, as the inner ring scratch feature amount and the outer ring scratch feature amount, amplitudes in each of the inner ring scratch frequency fin and the outer ring scratch frequency fout shown in Table 1. The extraction unit 34 transfers the extracted outer ring scratch feature amount and inner ring scratch feature amount to the estimation unit 36. The estimation unit 36 stores the feature amounts transferred from the extraction unit 34 in the feature amount DB 42 as shown in FIG. 14 in association with the operation time of the diagnosis target equipment 60.

Figure 19:
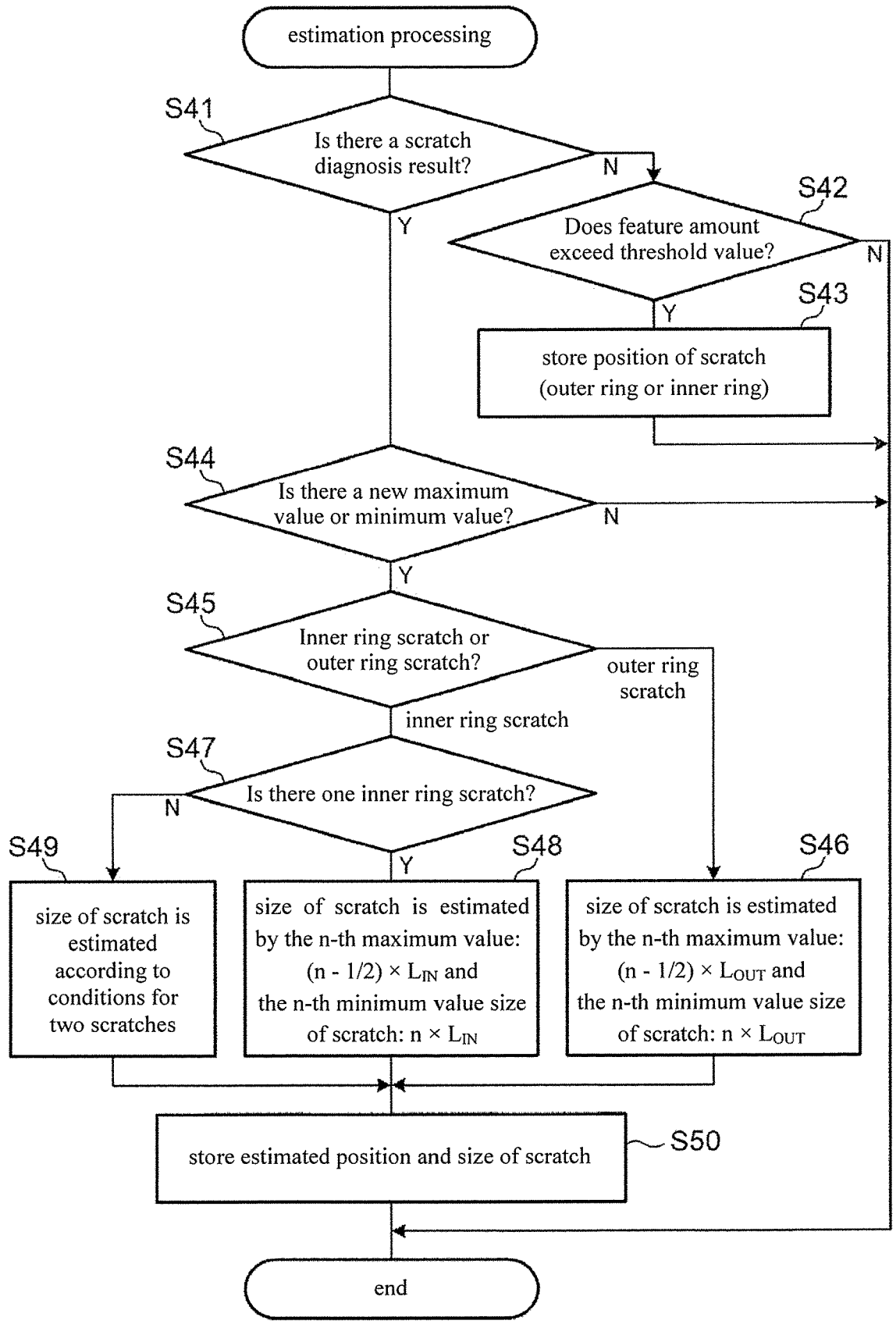
FIG. 19 is a flowchart showing an example of estimation processing.

Next, in step S40, estimation processing is performed. Here, the estimation processing is described in detail with reference to FIG. 19.

In step S41, the estimation unit 36 determines with reference to the diagnosis result DB 44 whether a scratch diagnosis result is stored. When both the inner ring scratch feature amount and the outer ring scratch feature amount maintain normal values, no scratch diagnosis result is stored in the diagnosis result DB 44. When the scratch diagnosis result is stored, the processing proceeds to step S44, and when the scratch diagnosis result is not stored, the processing proceeds to step S42.

In step S42, the estimation unit 36 determines whether either the inner ring scratch feature amount or the outer ring scratch feature amount exceeds the threshold value. When the threshold value is exceeded, the processing proceeds to step S43, and when the threshold value is not exceeded, the estimation processing ends, and the processing returns to the diagnosis processing (FIG. 18).

In step S43, the estimation unit 36 stores, in the diagnosis result DB 44 and in association with the operation time of the diagnosis target equipment 60, that the position of the scratch is the inner ring 74 when the inner ring scratch feature amount exceeds the threshold value and the position of the scratch is the outer ring 72 when the outer ring scratch feature amount exceeds the threshold value. Then, the estimation processing ends, and the processing returns to the diagnosis processing (FIG. 18).

In step S44, the estimation unit 36 determines whether a new maximum value or minimum value is generated in either the change in the inner ring scratch feature amount or the change in the outer ring scratch feature amount. When a new maximum value or minimum value is generated, the processing proceeds to step S45, and when no new maximum value or minimum value is generated, the estimation processing ends, and the processing returns to the diagnosis processing (FIG. 18).

In step S45, the estimation unit 36 determines whether the new maximum value or minimum value is generated for the inner ring scratch feature amount or the outer ring scratch feature amount. In the case of the outer ring scratch feature amount, the processing proceeds to step S46, and in the case of the inner ring scratch feature amount, the processing proceeds to step S47.

In step S46, when the new maximum value or minimum value determined to be generated in the above step S44 is the n-th maximum value of the outer ring scratch feature amount, the estimation unit 36 estimates $(n-\frac{1}{2}) \times L_{OUT}$ ($L_{OUT}$=0.5×the circumference of the outer ring) as the size of the outer ring scratch. In addition, when the new maximum value or minimum value determined to be generated in the above step S44 is the n-th minimum value of the outer ring scratch feature amount, the estimation unit 36 estimates $n \times L_{OUT}$ as the size of the outer ring scratch.

In step S47, the estimation unit 36 determines whether there is one inner ring scratch by determining whether the inner ring scratch feature amount is the initial maximum value or whether a difference between the n-th maximum value and the (n−1)-th maximum value of the inner ring scratch feature amount is less than the predetermined value. When there is one inner ring scratch, the processing proceeds to step S48, and when there are two inner ring scratches, the processing proceeds to step S49. Moreover, with reference to the diagnosis result DB 44, when it is estimated that there are two inner ring scratches in the past diagnosis result, the determination in this step may be omitted, and the processing may proceed to step S49.

In step S48, when the new maximum value or minimum value determined to be generated in the above step S44 is the n-th maximum value of the inner ring scratch feature amount, the estimation unit 36 estimates $(n-\frac{1}{2}) \times L_{IN}$ ($L_{IN}$=the distance between the rolling elements) as the size of the inner ring scratch. In addition, when the new maximum value or minimum value determined to be generated in the above step S44 is the n-th minimum value of the inner ring scratch feature amount, the estimation unit 36 estimates $n \times L_{IN}$ as the size of the inner ring scratch.

In step S49, the estimation unit 36 sets the size $X_A$ of the scratch A (the scratch generated earlier) equal to greater than the size of a scratch at the time point of the previous estimation, and sets the size $X_B$ of the scratch B (the scratch generated later) smaller than $X_A$. In addition, the estimation unit 36 sets the greatest value of the sum of $X_A$ and $X_B$ as a value predicted based on the circumference of the inner ring or a past inner ring scratch feature amount, and sets combinations of $X_A$ and $X_B$ according to the conditions in the above Table 2 as the combinations of the candidate sizes. Then, the estimation unit 36 estimates the greatest value or the average value of the combinations of the candidate sizes as $X_A$ and $X_B$.

Next, in step S50, the estimation unit 36 stores the position of the scratch (the outer ring 72 or the inner ring 74) estimated in the above step S45 and the size of the scratch estimated in the above step S46, S48, or S49 in the diagnosis result DB 44 as the diagnosis result in association with the operation time. In addition, the estimation unit 36 transfers the diagnosis result to the output unit 38. Then, the estimation processing ends, and the processing returns to the diagnosis processing (FIG. 18).

Next, in step S60 of the diagnosis processing (FIG. 18), the output unit 38 outputs the diagnosis result stored in the diagnosis result DB 44.

Next, in step S70, the output unit 38 determines whether the diagnosis result has reached an end condition of the diagnosis processing. As the end condition, for example, conditions such as a case that the size of the scratch reaches a size pre-set by the user, a case that two scratches are generated, and the like are predetermined. When the end condition is not reached, the processing returns to step S10, and when the end condition is reached, the diagnosis processing ends.

As described above, according to the diagnosis apparatus of the first embodiment, the amplitudes in each of the inner ring scratch frequency $f_{in}$ and the outer ring scratch frequency $f_{out}$ are extracted as the inner ring scratch feature amount and the outer ring scratch feature amount from the result of the frequency analysis of the measurement data relating to the vibrations corresponding to the rotation of the bearing mechanism. Then, the size of the inner ring scratch or the outer ring scratch is estimated based on the predetermined relationship between the change of the inner ring scratch feature amount and the outer ring scratch feature amount and the size of the scratch. Thereby, not only the presence or absence of an abnormality in the bearing mechanism, but also the position and the size of the scratch generated in the bearing mechanism can be grasped, and the degradation degree of the bearing mechanism can be diagnosed.

In addition, because the degradation degree of the bearing mechanism can be diagnosed as described above, the user can determine timings of periodic inspection, decelerator replacement, lubricating oil replacement, and the like according to the deterioration state, and countermeasure and countermeasure timing are easily determined according to the deteriorated state of the diagnosis target equipment. In addition, because information showing the specific deteriorated state such as the size of the scratch is obtained, provisional life support of the diagnosis target equipment, for example, countermeasure of changing to an operation with less load or the like is also easy to be taken according to a delivery date of the replacement component.

Furthermore, because work of taking out the lubricating oil or the like inside the decelerator to measure iron powder concentration is not necessary, the number of man-hours for the diagnosis work can be reduced.

Second Embodiment

Next, a second embodiment is described. Moreover, in a diagnosis apparatus according to the second embodiment, configurations the same as that of the diagnosis apparatus 10 according to the first embodiment are denoted with the same reference numerals, and specific description is omitted. In addition, because hardware configurations of the diagnosis apparatus according to the second embodiment are the same as the hardware configurations of the diagnosis apparatus 10 according to the first embodiment shown in FIG. 1, description is omitted.

As shown in FIG. 2 or FIG. 7, similarly to the diagnosis apparatus 10 according to the first embodiment, a diagnosis apparatus 210 according to the second embodiment diagnoses a scratch using a production machine such as a robot or the like as the diagnosis target equipment 60.

As shown in FIG. 6, the diagnosis apparatus 210 includes the acquisition unit 32, an extraction unit 234, the estimation unit 36, and the output unit 38 as functional configurations. In addition, the feature amount DB 42 and the diagnosis result DB 44 are stored in a predetermined storage region of the diagnosis apparatus 210. Each functional configuration is realized in a manner that the CPU 12 reads out a diagnosis program stored in the storage device 16 and expands the diagnosis program in the memory 14 to perform the diagnosis program.

The extraction unit 234 extracts an outer ring scratch feature amount and an inner ring scratch feature amount similarly to the extraction unit 34 of the first embodiment.

Here, when the diagnosis target equipment 60 is a robot that performs conveyor picking or the like, an operation speed and an operation distance of the robot differ for each cycle, and thus the rotation speed of the bearing mechanism also differs for each cycle. In this case, compared with the case of the diagnosis target equipment 60 that performs a simple operation, even if the state of the scratch in the bearing mechanism is the same, estimation accuracy of the size of the scratch may decrease. The reason is that the method of changing the acquired measurement data according to the operation of the diagnosis target equipment 60 is different from that of the diagnosis target equipment 60 performing a simple operation.

Therefore, even if the operation of the diagnosis target equipment 60 varies for each cycle, the extraction unit 234 of the second embodiment suppresses influence on the estimation of the size of the scratch caused by the change of the measurement data and stably extracts the outer ring scratch feature amount and the inner ring scratch feature amount.

Specifically, the extraction unit 234 normalizes the extracted outer ring scratch feature amount and inner ring scratch feature amount so as to suppress the change of the measurement data caused by the operation of the diagnosis target equipment 60. More specifically, the extraction unit 234 normalizes each of the outer ring scratch feature amount and the inner ring scratch feature amount in a manner that the value of a feature amount extracted in a normal state with no scratch becomes the smallest value, and the first maximum value in the change of the feature amount described in the first embodiment (FIG. 15 and FIG. 16) becomes the greatest value. Moreover, the reason for using the first maximum value is that in the first maximum value of the change of the feature amount, there is a high possibility that there is still one scratch, and the magnitude of the feature amount is easy to take a constant value. However, if the size of the scratch is known to some extent, the feature amount may be normalized in a manner that any n-th maximum value becomes the greatest value. In addition, the smallest value in the normalization is not limited to the case of using the feature amount extracted in the normal state with no scratch, and a pre-set value (for example, zero) predetermined as a value corresponding to the feature amount extracted in the normal state with no scratch may be used. In addition, the greatest value in the normalization is not limited to the case of using the maximum value, and a value within a predetermined range including the maximum value, that is, a value near the maximum value may be used. For example, a value smaller than the maximum value by a predetermined value may be normalized as the greatest value.

Figure 20:
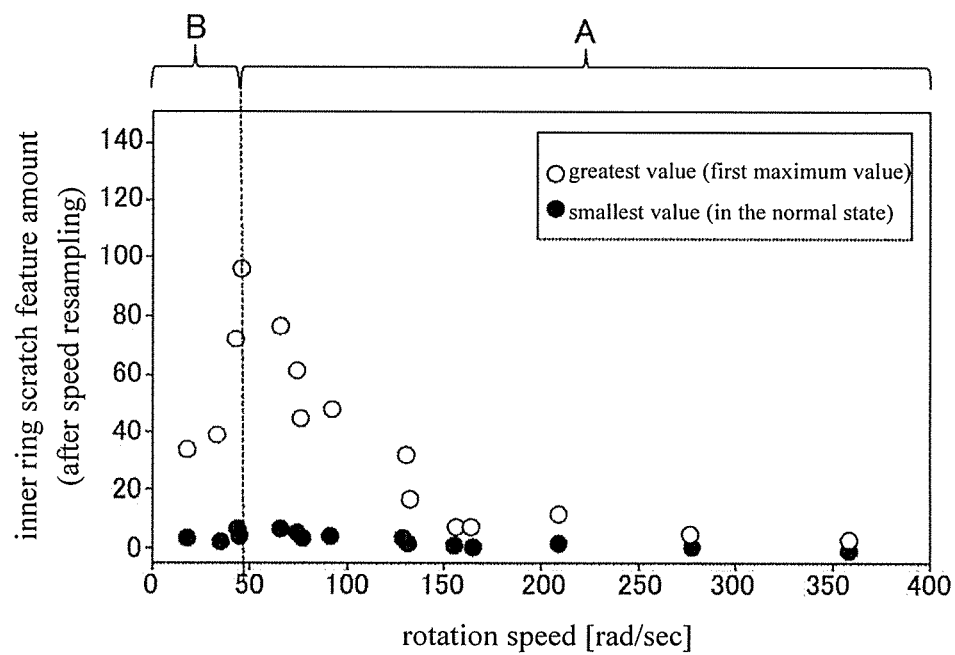
FIG. 20 is a diagram showing an example of a model showing a relationship between a rotation speed of the bearing mechanism and the feature amount.

For example, the greatest value and the smallest value are obtained in advance for each of the rotation speeds of the bearing mechanism corresponding to the operation expected for the diagnosis target equipment 60, and a model that associates the rotation speed and the greatest value and the smallest value of the feature amount as shown in FIG. 20 is prepared. The model can be created in advance based on the feature amounts extracted from measurement data which is measured while varying the rotation speed of the bearing mechanism under an experimental environment in the normal state with no scratch and in the state when the scratch having the predetermined size is generated. Moreover, in FIG. 20, the model for normalizing the inner ring scratch feature amount is shown, and a same model may be prepared for the outer ring scratch feature amount.

Here, the vibration of the decelerator 64 becomes smaller as a lubricating oil film in the decelerator 64 becomes thicker. In addition, the thickness of the lubricating oil film in the decelerator 64 is proportional to the rotation speed of the rolling of the rolling elements 76. Thus, as shown in FIG. 20, in the model showing the relationship between the rotation speed of the bearing mechanism and the feature amount, when the rotation speed is equal to or greater than a predetermined speed, the thickness of the lubricating oil film in the decelerator 64 increases according to the rotation speed, and the vibration due to the scratch, that is, the feature amount decreases (A in FIG. 20). On the other hand, when the rotation speed of the bearing mechanism is extremely low, the lubricating oil film is hardly formed. That is, because the thickness of the lubricating oil film is a value approaching zero, the vibration, that is, the feature amount increases as the rotation speed of the bearing mechanism rises (B in FIG. 20). Accordingly, the above model can be regarded as being represented by two models, one is an increase in the vibration as the rotation speed of the bearing mechanism increases, and the other is a decrease in the vibration as the thickness of the lubricating oil film increases due to the increase of the rotation speed of the bearing mechanism.

The extraction unit 234 acquires the rotation speed of the bearing mechanism when extracting the feature amount and acquires the greatest value and the smallest value of the feature amount in the rotation speed with reference to the above model. Then, the extraction unit 234 uses the greatest value and the smallest value of the acquired feature amount to normalize the feature amount by, for example, the following equation (3).

[Formula 2]

$$x'_t = \frac{x_t - f_{min}(v_t)}{f_{max}(v_t) - f_{min}(v_t)} \quad (3)$$

In the equation (3), $x'_t$ is a feature amount after the normalization, $x_t$ is a feature amount before the normalization extracted from the measurement data measured at time t, and $v_t$ is a rotation speed of the bearing mechanism at the time t. In addition, $f_{max}(v_t)$ is the greatest value and $f_{min}(v_t)$ is the smallest value of the feature amount which is acquired from the above model and in association with the rotation speed $V_t$.

Next, actions of the diagnosis apparatus 210 according to the second embodiment are described.

Figure 21:
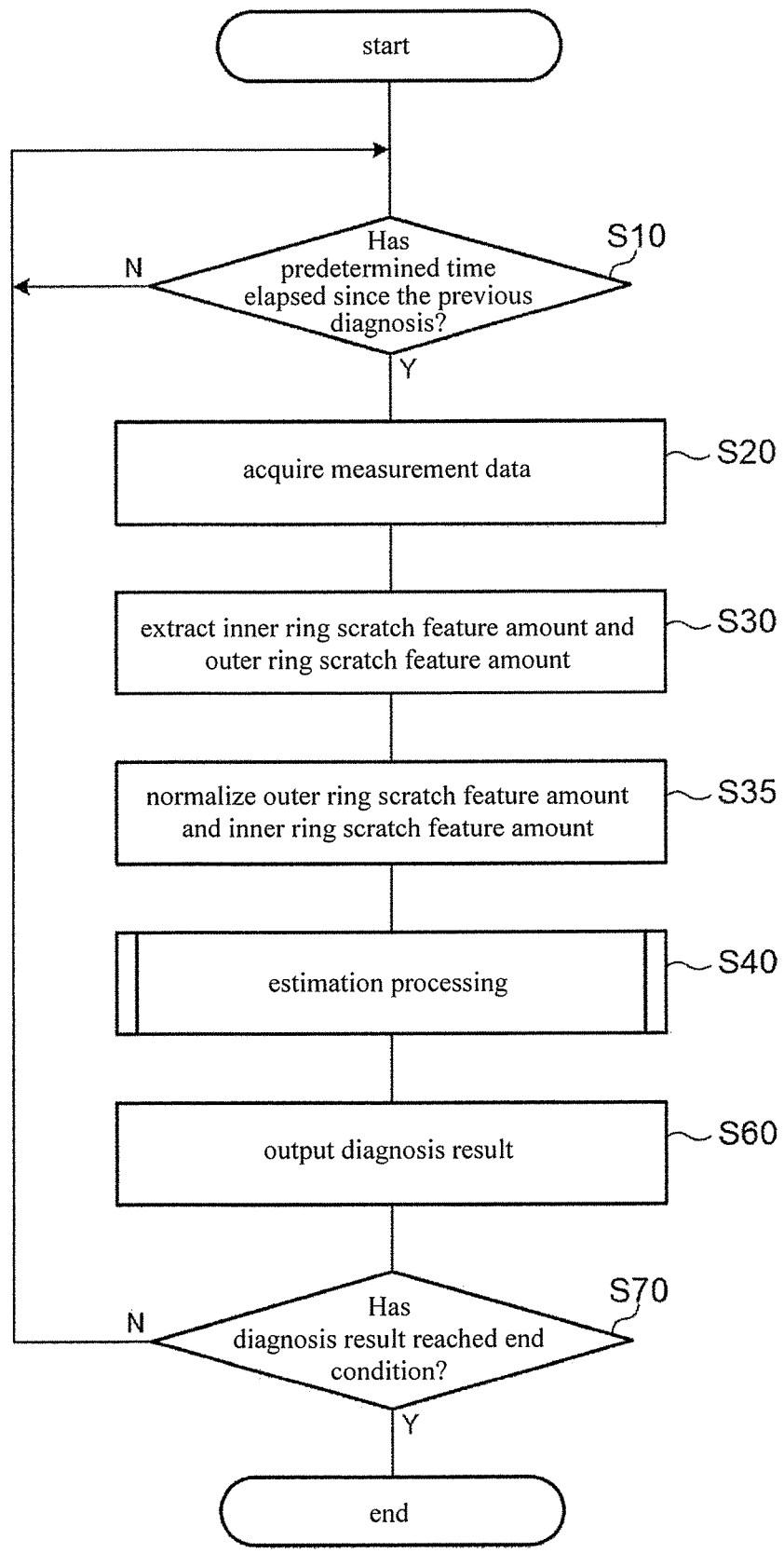
FIG. 21 is a flowchart showing an example of diagnosis processing in a second embodiment.

FIG. 21 is a flowchart showing the flow of the diagnosis processing executed by the CPU 12 of the diagnosis apparatus 210. The CPU 12 reads out the diagnosis program from the storage device 16 and expands the diagnosis program in the memory 14 to perform the diagnosis program, and thereby the CPU 12 functions as each functional configuration of the diagnosis apparatus 210, and the diagnosis processing shown in FIG. 21 is performed.

The diagnosis processing in the second embodiment is different from the diagnosis processing in the first embodiment (FIG. 18) in that step S35 is performed between step S30 and step S40. In step S35, the extraction unit 234 normalizes each of the outer ring scratch feature amount and the inner ring scratch feature amount extracted in the above step S30 by using, for example, the model shown in FIG. 20 and the above equation (3), and transfers the feature amount after the normalization to the estimation unit 36.

As described above, according to the diagnosis apparatus of the second embodiment, the greatest value and the smallest value of the feature amount corresponding to the rotation speed of the bearing mechanism at the time of extracting the feature amount are acquired based on the model prepared in advance and showing the relationship between the rotation speed of the bearing mechanism and the feature amount. Then, the extracted feature amount is normalized using the acquired greatest value and smallest value. Thereby, the influence of the change of the measurement data caused by the operation of the diagnosis target equipment is suppressed, and even when the diagnosis target equipment in which the operation speed and the operation distance differ for each cycle is used as a target, the same effect as the first embodiment can be obtained.

Moreover, in each of the above embodiments, the example of the wave gear device is mainly described as the bearing mechanism, but the disclosure is also applicable to a general bearing. In this case, when it is determined to be an inner ring scratch in step S45 of the above estimation processing (FIG. 19), the processing proceeds to step S48 and the processing in steps S47 and S49 may be omitted.

In addition, the diagnosis processing performed in a manner that the CPU reads in the software (the program) in each of the above embodiments may be performed by various processors other than the CPU. The processor in this case may be a programmable logic device (PLD) capable of changing the circuit configuration after manufacturing, such as a field-programmable gate array (FPGA), or may be a dedicated electric circuit which serves as a processor having a circuit configuration designed dedicated for performing specified processing, such as a application specific integrated circuit (ASIC), and the like. In addition, the diagnosis processing may be performed by one of the various processors, or may be performed by a combination of two or more processors of the same type or different types (for example, a plurality of FPGAs, a combination of CPU and FPGA, or the like). In addition, the hardware structure of the various processors is, more specifically, an electric circuit in which circuit elements such as semiconductor elements are combined.

In addition, in each of the above embodiments, the aspect in which the diagnosis program is stored (installed) in the storage device in advance is described, but the disclosure is not limited hereto. The program may be provided in a form stored in a storage medium such as a CD-ROM, a DVD-ROM, a Blu-ray disc, a USB memory, or the like. In addition, the program may be in a form downloaded from an external apparatus via a network.

Other Configurations

The diagnosis apparatus according to the disclosure includes: an acquisition unit that acquires data relating to vibrations corresponding to a rotation of a bearing mechanism including rolling elements between an outer ring and an inner ring; an extraction unit that extracts a feature amount from a result of performing a frequency analysis on the data acquired by the acquisition unit; an estimation unit that estimates a size of a scratch generated on the outer ring or the inner ring based on a predetermined relationship between a change of the feature amount and the size of the scratch generated on the outer ring or the inner ring, and based on the feature amount extracted by the extraction unit; and an output unit that outputs an estimation result of the estimation unit.

In addition, in the result of performing the frequency analysis on the data, the extraction unit may extract, as a feature amount of the outer ring, an amplitude of a frequency predetermined as a frequency at which a peak occurs when the scratch is generated on the outer ring, and the extraction unit may extract, as a feature amount of the inner ring, an amplitude of a frequency predetermined as a frequency at which a peak occurs when the scratch is generated on the inner ring.

In addition, the estimation unit may estimate that the scratch is generated on the outer ring when the feature amount of the outer ring exceeds a predetermined threshold value, and estimate that the scratch is generated on the inner ring when the feature amount of the inner ring exceeds the threshold value.

In addition, when the estimation unit estimates that the scratch is generated on the outer ring, the estimation unit may estimate the size of the scratch at a time point when the feature amount that changes over time reaches an n-th maximum value to be a size of (n-½) times half a circumference of the outer ring, and estimate the size of the scratch at a time point when the feature amount reaches an n-th minimum value to be a size of n times half the circumference of the outer ring, or the estimation unit may estimate the size of the scratch at the time point when the feature amount that changes over time reaches the n-th maximum value to be a size of (n-½) times the distance between the rolling elements, and estimate the size of the scratch at the time point when the feature amount reaches an n-th minimum value to be a size of n times the distance between the rolling elements.

In addition, when the estimation unit estimates that the scratch is generated on the inner ring, the estimation unit may estimate the size of the scratch at a time point when the feature amount that changes over time reaches an initial maximum value and at a time point when the feature amount reaches an n-th maximum value when a difference between the n-th maximum value and an (n-1)-th maximum value of the feature amount that changes over time is less than a predetermined value to be a size of (n-½) times a distance between the rolling elements, estimate the size of the scratch at a time point when the feature amount reaches an n-th minimum value to be a size of n times the distance between the rolling elements, and estimate that two scratches are generated on the inner ring when a difference between the n-th maximum value and the (n-1)-th maximum value of the feature amount that changes over time is equal to or greater than the predetermined value.

In addition, when the estimation unit estimates that two scratches are generated on the inner ring, the estimation unit may estimate that a size of one of the scratches is greater than a size of the scratch at a time of a previous estimation, and estimate that a size of the other scratch is smaller than the size of the one scratch.

In addition, the estimation unit may estimate the sizes of the two scratches at the time point when the feature amount that changes over time reaches the n-th maximum value from combinations in which a difference between the size of the one scratch and the size of the other scratch is n times the distance between the rolling elements, and estimate the sizes of the two scratches at the time point when the feature amount reaches the n-th minimum value from combinations in which a sum of the size of the one scratch and the size of the other scratch is n times or ½ times the distance between the rolling elements.

In addition, the estimation unit may estimate a greatest value or an average value of the combinations as the sizes of the two scratches.

In addition, the estimation unit may predict, based on an over-time change of the feature amount, the sizes of the scratches at the time point when the n-th maximum value or the n-th minimum value is reached, and estimate the sizes of the two scratches from the combinations of values within a predetermined range including the predicted sizes.

In addition, the extraction unit may normalize the extracted feature amount using a first feature amount and a second feature amount corresponding to a rotation speed of the bearing mechanism when the data is acquired by the acquisition unit or using a pre-set value predetermined as a value corresponding to the first feature amount and the second feature amount, the first feature amount and the second feature amount being specified based on a predetermined relationship between a rotation speed of the bearing mechanism and the first feature amount in a state with no scratch and the second feature amount in a state in which a predetermined scratch exists.

In addition, the extraction unit may normalize the extracted feature amount using the first feature amount or the pre-set value as a smallest value and using the second feature amount as a greatest value. Furthermore, the extraction unit may use a value within a predetermined range including an initial maximum value of the feature amount that changes over time as the second feature amount.

In addition, the diagnosis method according to the disclosure is a method in which an acquisition unit acquires data relating to vibrations corresponding to a rotation of a bearing mechanism including rolling elements between an outer ring and an inner ring; an extraction unit extracts a feature amount from a result of performing a frequency analysis on the data acquired by the acquisition unit; an estimation unit estimates a size of a scratch generated on the outer ring or the inner ring based on a predetermined relationship between a change of the feature amount and a size of a scratch generated on the outer ring or the inner ring, and based on the feature amount extracted by the extraction unit; and an output unit outputs an estimation result of the estimation unit.

In addition, the diagnosis program according to the disclosure is a program for making a computer function as: an acquisition unit that acquires data relating to vibrations corresponding to a rotation of a bearing mechanism including rolling elements between an outer ring and an inner ring; an extraction unit that extracts a feature amount from a result of performing a frequency analysis on the data acquired by the acquisition unit; an estimation unit that estimates a size of a scratch generated on the outer ring or the inner ring based on a predetermined relationship between a change of the feature amount and a size of a scratch generated on the outer ring or the inner ring, and based on the feature amount extracted by the extraction unit; and an output unit that outputs an estimation result of the estimation unit.

According to the diagnosis apparatus, method, and program of the disclosure, the degradation degree of the bearing mechanism can be diagnosed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A diagnosis apparatus, comprising:
an acquisition unit that acquires data relating to vibrations corresponding to a rotation of a bearing mechanism comprising rolling elements between an outer ring and an inner ring;
an extraction unit that extracts a feature amount from a result of performing a frequency analysis on the data acquired by the acquisition unit;
an estimation unit that estimates a size of a scratch generated on the outer ring or the inner ring based on a predetermined relationship between a change of the feature amount and the size of the scratch generated on the outer ring or the inner ring, and based on the feature amount extracted by the extraction unit; and
an output unit that outputs an estimation result of the estimation unit,
wherein when the estimation unit estimates that the scratch is generated on the outer ring,
the estimation unit estimates the size of the scratch at a time point when the feature amount of outer ring the that changes over time reaches an n-th maximum value to be a size of $(n-\frac{1}{2})$ times half a circumference of the outer ring, and estimates the size of the scratch at a time point when the feature amount of outer ring reaches an n-th minimum value to be a size of n times half the circumference of the outer ring, or
the estimation unit estimates the size of the scratch at the time point when the feature amount of outer ring that changes over time reaches the n-th maximum value to be a size of $(n-\frac{1}{2})$ times a distance between the rolling elements, and estimates the size of the scratch at the time point when the feature amount of outer ring reaches an n-th minimum value to be a size of n times the distance between the rolling elements.

2. The diagnosis apparatus according to claim 1, wherein in the result of performing the frequency analysis on the data, the extraction unit extracts, as a feature amount of the outer ring, an amplitude of a signal having a frequency predetermined as a frequency at which a peak occurs when the scratch is generated on the outer ring, and the extraction unit extracts, as a feature amount of the inner ring, an amplitude of a frequency predetermined as a frequency at which a peak occurs when the scratch is generated on the inner ring.

3. The diagnosis apparatus according to claim 2, wherein the estimation unit estimates that the scratch is generated on the outer ring when the feature amount of the outer ring exceeds a predetermined threshold value, and estimates that the scratch is generated on the inner ring when the feature amount of the inner ring exceeds the threshold value.

4. The diagnosis apparatus according to claim 1, wherein when the estimation unit estimates that the scratch is generated on the inner ring,
the estimation unit estimates the size of the scratch at a time point when the feature amount of the inner ring that changes over time reaches an initial maximum value and at a time point when the feature amount of the inner ring reaches an n-th maximum value when a difference between the n-th maximum value and an (n−1)-th maximum value of the feature amount of the inner ring that changes over time is less than a predetermined value to be a size of $(n-\frac{1}{2})$ times a distance between the rolling elements, estimates the size of the scratch at a time point when the feature amount of the inner ring reaches an n-th minimum value to be a size of n times the distance between the rolling elements, and estimates that two scratches are generated on the inner ring when a difference between the n-th maximum value and the (n−1)-th maximum value of the feature amount of the inner ring that changes over time is equal to or greater than the predetermined value.

5. The diagnosis apparatus according to claim 4, wherein when the estimation unit estimates that two scratches are generated on the inner ring, the estimation unit estimates that a size of one of the scratches is greater than a size of the scratch at a time of a previous estimation, and estimates that a size of the other scratch is smaller than the size of the scratch.

6. The diagnosis apparatus according to claim 5, wherein the estimation unit estimates the sizes of the two scratches at the time point when the feature amount of the inner ring that changes over time reaches the n-th maximum value when a difference between the size of the one scratch and the size of the other scratch is n times the distance between the rolling elements, and estimates the sizes of the two scratches at the time point when the feature amount of the inner ring reaches the n-th minimum value when a sum of the size of the one scratch and the size of the other scratch is n times or ½ times the distance between the rolling elements.

7. The diagnosis apparatus according to claim 6, wherein the estimation unit estimates a greatest value or an average value as the sizes of the two scratches.

8. The diagnosis apparatus according to claim 6, wherein the estimation unit predicts, based on an over-time change of the feature amount of the inner ring, the sizes of the scratches at the time point when the n-th maximum value or the n-th minimum value is reached, and estimates the sizes of the two scratches from the combinations of values within a predetermined range comprising the predicted sizes.

9. The diagnosis apparatus according to claim 1, wherein the extraction unit normalizes the extracted feature amount using a first feature amount and a second feature amount corresponding to a rotation speed of the bearing mechanism when the data is acquired by the acquisition unit or using a pre-set value predetermined as a value corresponding to the first feature amount and the second feature amount, the first feature amount and the second feature amount being specified based on a predetermined relationship between the rotation speed of the bearing mechanism and the first feature amount in a state with no scratch and the second feature amount in a state in which a predetermined scratch exists.

10. The diagnosis apparatus according to claim 9, wherein the extraction unit normalizes the extracted feature amount using the first feature amount or the pre-set value as a smallest value and using the second feature amount as a greatest value.

11. The diagnosis apparatus according to claim 9, wherein the extraction unit uses a value within a predetermined range comprising an initial maximum value of the feature amount that changes over time as the second feature amount.

12. The diagnosis apparatus according to claim 10, wherein the extraction unit uses a value within a predetermined range comprising an initial maximum value of the feature amount that changes over time as the second feature amount.

13. A diagnosis method, comprising:
acquiring, by an acquisition unit, data relating to vibrations corresponding to a rotation of a bearing mechanism comprising rolling elements between an outer ring and an inner ring;
extracting, by an extraction unit, a feature amount from a result of performing a frequency analysis on the data acquired by the acquisition unit;
estimating, by an estimation unit, a size of a scratch generated on the outer ring or the inner ring based on a predetermined relationship between a change of the feature amount and a size of a scratch generated on the outer ring or the inner ring, and based on the feature amount extracted by the extraction unit; and
outputting, by an output unit, an estimation result of the estimation unit,
wherein when the estimation unit estimates that the scratch is generated on the outer ring,
the estimation unit estimates the size of the scratch at a time point when the feature amount of outer ring the that changes over time reaches an n-th maximum value to be a size of (n−½) times half a circumference of the outer ring, and estimates the size of the scratch at a time point when the feature amount of outer ring reaches an n-th minimum value to be a size of n times half the circumference of the outer ring, or
the estimation unit estimates the size of the scratch at the time point when the feature amount of outer ring that changes over time reaches the n-th maximum value to be a size of (n−½) times a distance between the rolling elements, and estimates the size of the scratch at the time point when the feature amount of outer ring reaches an n-th minimum value to be a size of n times the distance between the rolling elements.

14. A non-transitory computer-readable recording medium that stores a diagnosis program for making a computer function as:
an acquisition unit that acquires data relating to vibrations corresponding to a rotation of a bearing mechanism comprising rolling elements between an outer ring and an inner ring;
an extraction unit that extracts a feature amount from a result of performing a frequency analysis on the data acquired by the acquisition unit;
an estimation unit that estimates a size of a scratch generated on the outer ring or the inner ring based on a predetermined relationship between a change of the feature amount and a size of a scratch generated on the outer ring or the inner ring, and based on the feature amount extracted by the extraction unit; and
an output unit that outputs an estimation result of the estimation unit,
wherein when the estimation unit estimates that the scratch is generated on the outer ring,
the estimation unit estimates the size of the scratch at a time point when the feature amount of outer ring the that changes over time reaches an n-th maximum value to be a size of (n−½) times half a circumference of the outer ring, and estimates the size of the scratch at a time point when the feature amount of outer ring reaches an n-th minimum value to be a size of n times half the circumference of the outer ring, or
the estimation unit estimates the size of the scratch at the time point when the feature amount of outer ring that changes over time reaches the n-th maximum value to be a size of (n−½) times a distance between the rolling elements, and estimates the size of the scratch at the time point when the feature amount of outer ring reaches an n-th minimum value to be a size of n times the distance between the rolling elements.

* * * * *